United States Patent  
Nakajima

(10) Patent No.: US 7,599,105 B2
(45) Date of Patent: Oct. 6, 2009

(54) OPTICAL SCANNING DEVICE AND IMAGE FORMING APPARATUS WHEREIN THE POSITION OF THE ROTATIONAL AXIS OF THE OSCILLATING MIRROR IS FIXED IN THE PLANE ORTHOGONAL TO THE TORSION BEAM SUCH THAT THE ROTATIONAL AXIS OF THE OSCILLATING MIRROR MEETS THE INTERSECTION POINT OF A LIGHT BEAM FROM A LIGHT SOURCE UNIT AND A LIGHT AXIS OF THE FOCUSING OPTICAL SYSTEM

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/609,098

(22) Filed: Dec. 11, 2006

(65) Prior Publication Data  
US 2007/0146851 A1 Jun. 28, 2007

(30) Foreign Application Priority Data  
Dec. 26, 2005 (JP) ............................. 2005-372903

(51) Int. Cl.  
G02B 26/08 (2006.01)

(52) U.S. Cl. ............... 359/220.1; 359/200.7; 359/204.1; 359/213.1; 359/224.1; 347/261

(58) Field of Classification Search ......... 359/198–199, 359/224, 220.1, 204.1, 213.1, 224.1, 200.7; 347/261  
See application file for complete search history.

(56) References Cited  
U.S. PATENT DOCUMENTS 5,559,581 A * 9/1996 Sugiura et al. .............. 399/111
5,610,438 A * 3/1997 Wallace et al. .............. 257/682
6,295,154 B1 * 9/2001 Laor et al. ................... 359/223
6,426,013 B1 * 7/2002 Neukermans et al. ......... 216/24
6,657,765 B2   12/2003 Hayashi et al.
6,844,951 B2 * 1/2005 Cannon et al. .............. 359/223
6,870,560 B2 * 3/2005 Bush et al. ................... 347/259

(Continued)

FOREIGN PATENT DOCUMENTS

JP          3-9318          1/1991

(Continued)

OTHER PUBLICATIONS

U.S. Appl. No. 11/765,166, filed Jun. 19, 2007, Nakajima.

(Continued)

*Primary Examiner*—Stephone B Allen
*Assistant Examiner*—Jennifer L. Doak
(74) *Attorney, Agent, or Firm*—Oblon, Spivak, McClelland, Maier & Neustadt, L.L.P.

(57) ABSTRACT

A disclosed optical scanning device includes an oscillating mirror supported by a torsion beam for deflecting light beams from a light source unit to scan an object surface backward and forward. A window member transmits light beams incident on and reflected from an oscillating mirror. A sealing member holds the window member and seals a space in which the oscillating mirror is mounted.

12 Claims, 17 Drawing Sheets

U.S. PATENT DOCUMENTS

| | | |
|---|---|---|
| 6,932,271 B2 | 8/2005 | Nakajima et al. |
| 6,972,883 B2 | 12/2005 | Fujii et al. |
| 6,995,885 B2 | 2/2006 | Nakajima |
| 7,068,296 B2 | 6/2006 | Hayashi et al. |
| 2002/0122217 A1 | 9/2002 | Nakajima |
| 2002/0171878 A1 | 11/2002 | Nakajima |
| 2003/0053156 A1 | 3/2003 | Satoh et al. |
| 2004/0036936 A1 | 2/2004 | Nakajima et al. |
| 2005/0046917 A1 | 3/2005 | Fujii et al. |
| 2005/0134141 A1* | 6/2005 | Savic et al. ............ 310/309 |
| 2005/0185237 A1 | 8/2005 | Nakajima |
| 2005/0190426 A1* | 9/2005 | Urakawa et al. ......... 359/224 |
| 2005/0243396 A1 | 11/2005 | Fujii et al. |
| 2006/0012844 A1 | 1/2006 | Fujii et al. |
| 2006/0028533 A1 | 2/2006 | Nakajima |
| 2006/0232660 A1 | 10/2006 | Nakajima et al. |
| 2006/0245009 A1 | 11/2006 | Akiyama et al. |

FOREIGN PATENT DOCUMENTS

| | | |
|---|---|---|
| JP | 9-197330 | 7/1997 |
| JP | 2924200 | 5/1999 |
| JP | 3011144 | 12/1999 |
| JP | 3445691 | 6/2003 |
| JP | 3543473 | 4/2004 |
| JP | 2004-226651 | 8/2004 |
| JP | 2004-279947 | 10/2004 |
| JP | 2004-341320 | 12/2004 |
| JP | 2005-257944 | 9/2005 |

OTHER PUBLICATIONS

U.S. Appl. No. 12/028,446, filed Feb. 8, 2008, Nakamura, et al.
U.S. Appl. No. 12/051,404, Mar. 19, 2008, Amada, et al.

\* cited by examiner

OPTICAL SCANNING DEVICE AND IMAGE FORMING APPARATUS WHEREIN THE POSITION OF THE ROTATIONAL AXIS OF THE OSCILLATING MIRROR IS FIXED IN THE PLANE ORTHOGONAL TO THE TORSION BEAM SUCH THAT THE ROTATIONAL AXIS OF THE OSCILLATING MIRROR MEETS THE INTERSECTION POINT OF A LIGHT BEAM FROM A LIGHT SOURCE UNIT AND A LIGHT AXIS OF THE FOCUSING OPTICAL SYSTEM

BACKGROUND OF THE INVENTION

1. Field of the Invention

The present invention relates to an optical scanning device for optically scanning a scan object surface and an image forming apparatus including the same such as a copier, a printer, a facsimile machine, and a plotter.

The present invention can be applied to an optical scanning type barcode reader, an on-vehicle laser radar device, etc.

2. Description of the Related Art

In conventional optical scanning devices, a polygon mirror or a galvanometer mirror is employed as a deflector for scanning light beams. In order to achieve images of higher resolution and higher printing speeds, the deflector needs to be rotated at higher speed. However, there are limitations in high-speed scanning due to problems such as durability of the bearings and heat and noise caused by windage.

To address these problems, in recent years and continuing, research for deflectors employing silicon micro-machining is in progress. For example, Patent Documents 1, 2 disclose an oscillating mirror and a torsion beam pivotally supporting the oscillating mirror integrally formed with a Si substrate.

According to this method, the mirror surface size is small so that the deflector can be made compact. Further, this method is advantageous in that the oscillating mirror oscillates back and forth due to resonance so that the deflector can operate at high speed with low noise and low power consumption.

Moreover, the deflector operates at low oscillation frequencies and hardly generates any heat. Therefore, the optical scanning device can be housed in a housing made of a low-cost, thin, resin material containing a low percentage of glass fiber, without degrading image quality.

Patent Documents 3, 4 disclose examples in which an oscillating mirror is arranged instead of a polygon mirror.

Patent Documents 5, 6 disclose examples in which a deflector is covered by a partition member.

Patent Document 7 discloses an example in which an oscillating mirror is housed in a decompressed package.

FIG. 18 is a conceptual diagram of a simple, plate-type oscillating mirror. The following equations are satisfied, where the oscillating mirror has a length d in a direction parallel to the rotational axis, a width 2r in a direction orthogonal to the rotational axis, and a thickness t; the torsion beam has a length h and a width a; and the density of Si is $\rho$ and the material constant is G.

moment of inertia $I=(4\rho r dt/3) \cdot r2$ spring rate $K=(G/2h) \cdot \{at(a2+t2)/12\}$ Thus, the resonant frequency f0 is obtained as follows:

$f0=(1/2\pi) \cdot \sqrt{(K/I)}=(1/2\pi) \cdot \sqrt{\{Gat(a2+t2)/24LI\}}$

The length L of the torsion beam and an oscillation angle $\theta$ are substantially proportional. Thus, the oscillation angle $\theta$ is obtained as follows:

$$\theta = \kappa/I \cdot f02 \text{ (where } \kappa \text{ is a constant)} \quad (1)$$

The resonant frequency f0 changes according to the spring rate K of the torsion beam, thus changing the oscillation angle $\theta$.

Assuming that air density is $\eta$ when a peripheral speed of the oscillating mirror is $\upsilon$ and an area is E (=2rd), viscous resistance of air $P=C \cdot \eta \upsilon^2 \cdot E^3$ (where C is a constant).

This acts as a resistance to rotation of the oscillating mirror.

A relationship between an oscillating torque T and the oscillation angle $\theta$ is expressed as follows:

$$\theta = \kappa' \cdot T/K \text{ (where } \kappa' \text{ is a constant)} \quad (2)$$

Therefore, the oscillation angle $\theta$ can be stably maintained by adjusting the current applied to generate an oscillating torque T that compensates for changes in the spring rate K of the torsion beam and air resistance.

As described above, there are problems in that the oscillation angle changes due to changes in the resonant frequency accompanying variations in the spring rate K of the torsion beam caused by temperature fluctuations or due to changes in the viscous resistance of air caused by atmospheric pressure changes.

To solve these problems, Patent Document 8 discloses a technology for detecting an oscillation angle by detecting a scanned beam, and adjusting current applied to the oscillating mirror, thereby stably maintaining the oscillation angle.

Patent Document 1: Japanese Patent No. 2924200
Patent Document 2: Japanese Patent No. 3011144
Patent Document 3: Japanese Patent No. 3445691
Patent Document 4: Japanese Patent No. 3543473
Patent Document 5: Japanese Laid-Open Patent Application No. H3-9318
Patent Document 6: Japanese Patent No. 3469387
Patent Document 7: Japanese Laid-Open Patent Application No. 2004-226651
Patent Document 8: Japanese Laid-Open Patent Application No. 2004-279947

By using an oscillating mirror instead of a polygon mirror, noise and energy consumption can be reduced, thereby providing an image forming apparatus appropriate for an office environment. Further, the housing can be made of a thin material, thereby reducing weight and costs.

However, because the oscillating mirror operates by using a resonance phenomenon, a slight change in the surrounding temperature or convections in the air causes the oscillation angle (amplitude) to change. This changes the magnification rate or write start positions in a main scanning direction, which causes color displacement or color changes, thereby significantly degrading image quality.

Even if heat is prevented from being generated by the optical scanning device itself due to employing an oscillating mirror, temperatures vary at different areas inside the housing due to heat from a fixing device or a driving device included in the image forming apparatus. Thus, the atmosphere inside the housing is not uniform, which causes convection currents in the air.

The oscillating mirror stirs the surrounding air while oscillating, and therefore, power required for rotation changes according to the conditions of the atmosphere. Accordingly, the oscillation angle (amplitude) changes periodically, which changes the magnification rate or write start positions in the main scanning direction.

In a technique disclosed in Patent Document 8, light detecting sensors are arranged outside a main scanning area at a write start position and a write end position for detecting the scanning time. Based on the detected results, rotational force applied to the oscillating mirror is specified so that the magnification rate of the total width is stabilized for a certain amount of time. However, the atmosphere in which the oscillating mirror is located changes after printing a certain number of sheets, and therefore, the rotational force needs to be frequently controlled.

SUMMARY OF THE INVENTION

The present invention provides an optical scanning device and an image forming apparatus including the same, in which one or more of the above-described disadvantages is eliminated.

A preferred embodiment of the present invention provides an optical scanning device and an image forming apparatus including the same, in which changes in the oscillation angle (amplitude) can be reduced highly precisely, and high-quality images can be formed.

An embodiment of the present invention provides an optical scanning device, including a light source unit configured to irradiate a light beam; an oscillating mirror configured to deflect the light beam from the light source unit to scan a scan object surface backward and forward, the oscillating mirror being supported by a torsion beam; a focusing optical system configured to focus the light beam deflected by the oscillating mirror on the scan object surface; a housing unit configured to position the light source unit, the oscillating mirror, and the focusing optical system in a plane substantially orthogonal to at least the torsion beam; an oscillating mirror driving unit configured to rotate the oscillating mirror; a window member configured to transmit the light beam incident on and reflected from the oscillating mirror; and a sealing member configured to hold the window member and seal a space in which the oscillating mirror is mounted.

An embodiment of the present invention provides an image forming apparatus for forming an image, the image forming apparatus including the optical scanning device according to an embodiment of the present invention, wherein the oscillating mirror is driven at a predetermined scanning frequency, an electrostatic latent image is formed on an image carrier by modulating the light source unit according to image information during forward scanning or backward scanning, the electrostatic latent image is turned into a visible image, and the visible image is transferred onto a recording medium.

An embodiment of the present invention provides an image forming apparatus for forming a multicolor image, the image forming apparatus including the optical scanning device according to an embodiment of the present invention, wherein plural of the oscillating mirrors are provided, which mirrors are driven by a common scanning frequency, electrostatic latent images of different colors are formed on image carriers corresponding to the different colors by modulating the light source unit according to image information during forward scanning or backward scanning, the electrostatic latent images are turned into visible images, the visible images are superposed onto a transfer body, and the superposed visible images are transferred onto a recording medium.

According to one embodiment of the present invention, an optical scanning device and an image forming apparatus including the same are provided, in which changes in the oscillation angle (amplitude) can be reduced highly precisely, and high-quality images free of color displacement or color changes can be formed.

BRIEF DESCRIPTION OF THE DRAWINGS

Other objects, features and advantages of the present invention will become more apparent from the following detailed description when read in conjunction with the accompanying drawings, in which:

FIG. 5A is an overall front view, FIG. 5B is a back view, and FIG. 5C is a cut-away side view showing how the oscillating mirror substrate is bonded;

DETAILED DESCRIPTION OF THE PREFERRED EMBODIMENTS

A description is given, with reference to the accompanying drawings, of embodiments of the present invention.

Figure 1:
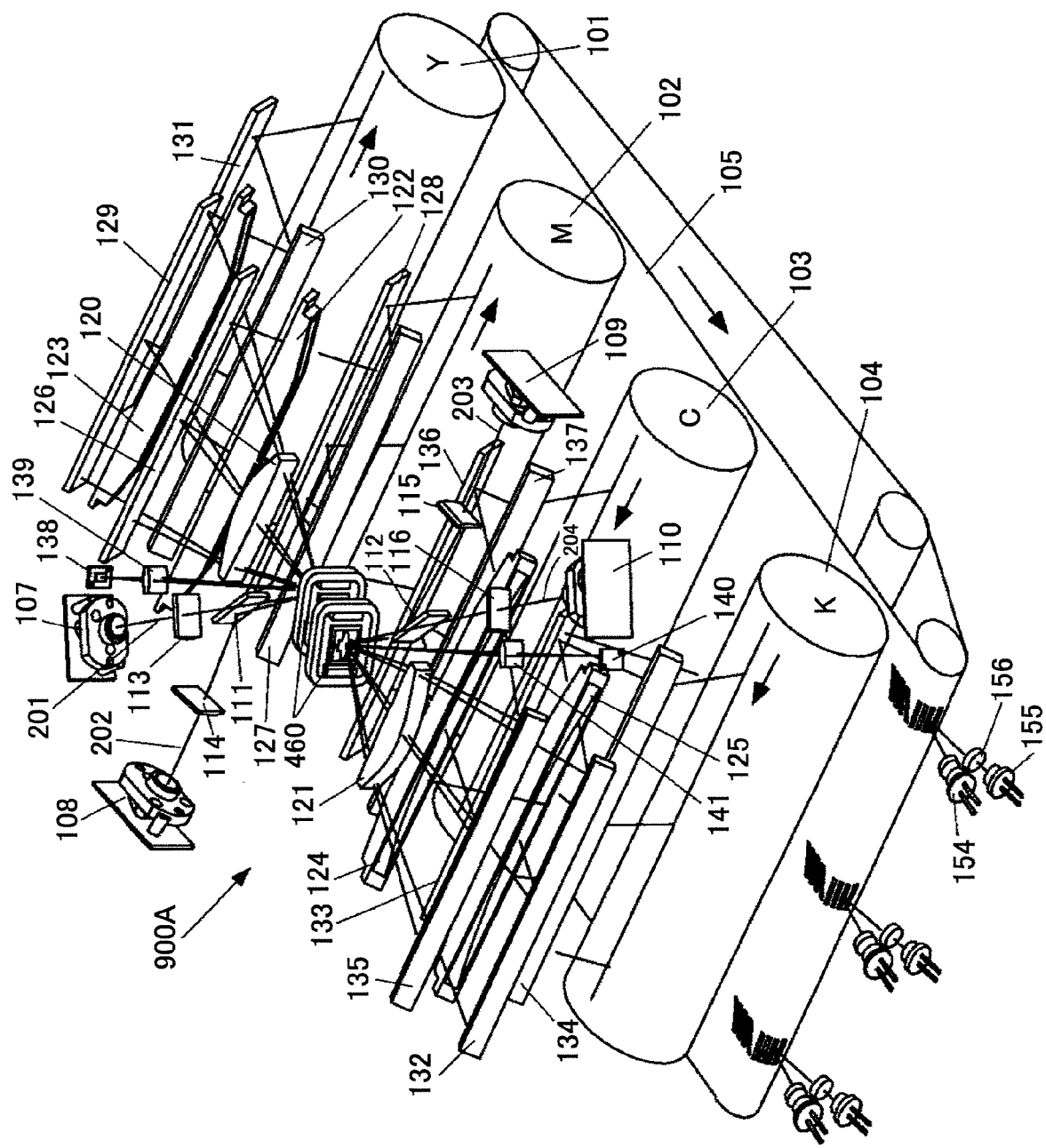
FIG. 1 is a perspective view of an optical scanning device according to a first embodiment of the present invention.

FIG. 1 is a perspective view of an optical scanning device 900A according to a first embodiment of the present invention. The optical scanning device 900A scans four stations (image forming stations corresponding to different colors). The four stations are divided into two groups, with each group including two stations. A pair of oscillating mirrors 460 is arranged so that each mirror faces opposite directions. Light beams are incident on each of the oscillating mirrors 460 to be deflected and to scan the stations.

Four photoconductive drums 101, 102, 103, 104 are arranged along a direction of movement of an intermediate transfer belt 105 functioning as a transfer body (direction indicated by arrow), with equal intervals therebetween. Toner images of different colors are sequentially transferred from the photoconductive drums 101, 102, 103, 104 to the intermediate transfer belt 105, superposed on one another, thereby forming a full-color image.

The optical scanning device 900A is configured integrally, and scans the photoconductive drums 101-104 with light beams from light source units (described below) corresponding to each of the photoconductive drums 101-104.

The oscillating mirrors 460 are arranged back-to-back and parallel to each other in the center part of the optical scanning device 900A. Light beams from the light source units are incident on the oscillating mirrors 460 slanted at a predetermined angle in a sub scanning direction, and are deflected all at once to scan the photoconductive drums 101-104.

Light source units 107, 108, 109, 110 functioning as light source means or light source devices are arranged as follows. Specifically, irradiating positions of the light source units 107, 110 are shifted from those of the light source units 108, 109 by a predetermined interval, respectively. Light beams 201, 202 from the light source units 107, 108, and light beams 203, 204 from the light source units 109, 110 are arranged symmetric to each other, so that light beams corresponding to a scanning angle θ=0, which are deflected when the oscillating mirrors 460 are still, are aligned on the same axis. Accordingly, the light beams 201, 202, 203, 204 simultaneously write images onto the photoconductive drums 101 to 104 corresponding to yellow, cyan, magenta, and black, in such a manner that the scanning directions of the stations are aligned by shifting the amplitude phases of the oscillating mirrors 460 by ½ period.

The light beams 201, 202, 203, 204 are irradiated from the light source units 107, 108, 109, 110 so that each of the incident angles in the main scanning direction with respect to normal lines of the oscillating mirrors 460 is 30 degrees. The light beams 202, 203 from the light source units 108, 109 turn back (are reflected) at incident mirrors 111, 112, respectively, so as to be aligned in the main scanning direction with light paths of the light beams 201, 204 from the light source units 107, 110 that directly reach the oscillating mirrors 460. Accordingly, the light beams 201, 202, 203, 204 are horizontally incident on the oscillating mirrors 460.

Each cylinder lens 113, 114, 115, 116 has a planar surface on one side and curved surface on the other side. The curved surfaces are curved by a common curvature in the sub scanning direction. The cylinder lenses 113-116 are arranged so that the lengths of the light paths to the deflection points of the oscillating mirrors 460 are equal. The light beams from the light source units 107, 108 and the light beams from the light source units 109, 110 are incident on the respective oscillating mirrors 460 to be vertically shifted relative to each other in the sub scanning direction across the optical axis. Thus, the light beams bend due to refracting power, and are obliquely incident on the oscillating mirrors 460, intersecting each other near the deflection surfaces.

The light beams converge on the deflection surfaces in a linear form in the main scanning direction. Including the use of toroidal lenses described below, an optical face tangle error correction is performed, by which the deflection point and the photoconductive drum surface are conjugate in the sub scanning direction.

After the light beams 201 through 204 are deflected, intervals therebetween are extended so that they separate from each other, and are incident on scanning lenses (also referred to as fθ lenses) 120, 121. The scanning lenses 120, 121 are resin molded into non-arc shaped surfaces with power (refracting power), with an f·arcsin property corresponding to sine wave oscillation of the oscillating mirror 460 in the main scanning direction, i.e., a property so that the change of a main scanning position per unit scanning angle dH/dθ is proportional to sin−1(θ/θ0). Accordingly, as the oscillating mirror 460 rotates, main scanning positions corresponding to pixels are corrected so that light beams move along the surface of the photoconductive drums at a substantially constant speed. Further, toroidal lenses 122, 123, 124, 125 provided at subsequent stages cause the light beams to focus on the photoconductive drum surfaces as spots and record latent images.

In the first embodiment, the oscillating mirrors for each of the stations are arranged so that rotational axes thereof match the center of images in the main scanning direction. Further, three return mirrors are provided for each station such that the lengths of light paths from the oscillating mirrors to each of the photoconductive drum surfaces are equal, and incident positions and incident angles onto the equally-spaced photoconductive drums are equal.

A description is given by following the light paths of the stations as shown in FIG. 1. The light beam 201 from the light source unit 107 is slanted downward via the cylinder lens 113, and made incident on the oscillating mirror 460. Then, the light beam 201 passes through the scanning lens 120, reflects off a return mirror 126, passes through the toroidal lens 122, reflects off return mirrors 127, 128, reaches the photoconductive drum 102, and forms a magenta image in a second station.

The light beam 202 from the light source unit 108 is slanted upward via the cylinder lens 114, reflected by the incident mirror 111, and made incident on the oscillating mirror 460. Then, the light beam 202 passes through the scanning lens 120, reflects off a return mirror 129, passes through the toroidal lens 123, reflects off return mirrors 130, 131, reaches the photoconductive drum 101, and forms a yellow image in a first station.

Third and fourth stations arranged symmetrically to the first and second stations have similar configurations. The light beam 203 from the light source unit 109 is deflected by the oscillating mirror 460 via the incident mirror 112. Then, the light beam 203 reflects off a return mirror 132, passes through the toroidal lens 125, reflects off return mirrors 133, 134, reaches the photoconductive drum 104, and forms a black image in a fourth station. The light beam 204 from the light source unit 110 is deflected by the oscillating mirror 460. Then, the light beam 204 reflects off a return mirror 135, passes through the toroidal lens 124, reflects off return mirrors 136, 137, reaches the photoconductive drum 103, and forms a cyan image in a third station. These components are integrally held in a single housing to be described below.

Synchronization sensors 138, 140 are mounted onto substrates. Each of the substrates corresponds to two opposing stations for detecting light beams on one side of a scanning area. As scanning is performed back and forth, detection signals from one of the synchronization sensors 138, 140 are used for forward scanning and detection signals from the other one of the synchronization sensors 138, 140 are used for backward scanning in order to generate synchronization detection signals for each station. Based on the synchronization detection signals, start timings for writing images are determined. Light beams deflected by the oscillating mirror 460 are converged by focusing lenses 139, 141 and are then incident on the synchronization sensors 138, 140.

As shown in FIG. 1, at a roller output part (left edge as viewed in FIG. 1) of the intermediate transfer belt 105, a detecting part is provided for detecting how precisely images of each color formed at each station are superposed on each another.

The detecting part reads detection patterns of toner images formed on the intermediate transfer belt 105 to detect resist (residual) displacement in the main scanning direction and in the sub scanning direction. These resist displacements are detected as displacements from a reference station, and corrections are made periodically.

In the first embodiment, the detecting part includes an LED element 154 for emitting light, a photosensor 155 for receiving reflected light, and a pair of condenser lenses 156. There are three detecting parts provided one each at the left and right edges and the middle of the intermediate transfer belt 105. Each detecting part reads a detection time difference between a standard black color, as the intermediate transfer belt 105 rotates.

Figure 2:
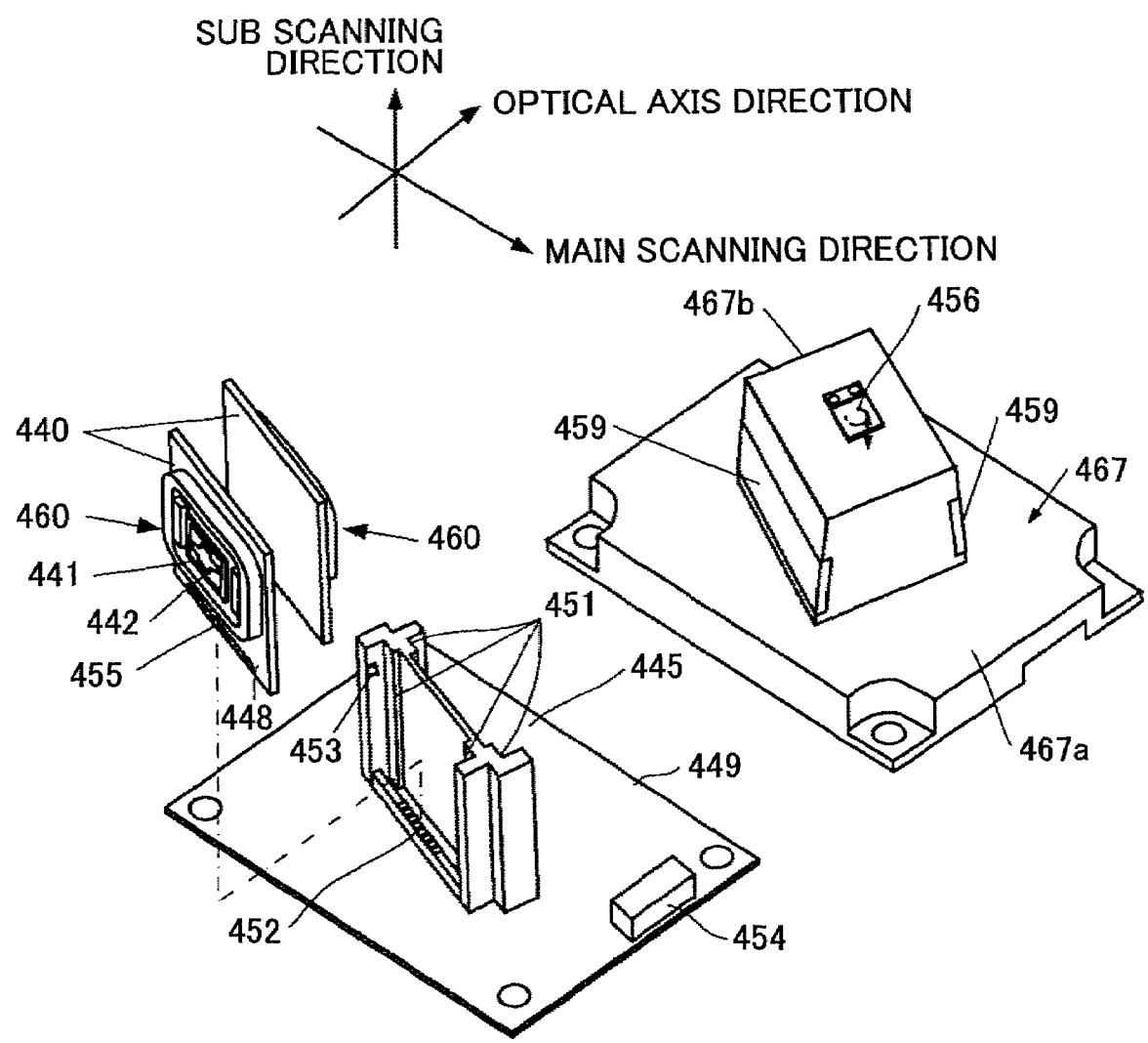
FIG. 2 is an exploded perspective view of an oscillating mirror module and a sealing member used in the optical scanning device shown in FIG. 1.

FIG. 2 is an exploded perspective view of an oscillating mirror module used in the optical scanning device 900A according to the first embodiment.

A description is given of an electromagnetic driving method for generating rotational torque of the oscillating mirror 460. A movable mirror 441, which is the mirror surface of the oscillating mirror 460, is pivotally supported by two torsion beams 442. As described below, the movable mirror 441 is fabricated by perforating the outline from a single Si substrate by etching, and is mounted on a mounting substrate 448. An oscillating mirror substrate 440 is a unit integrally combining the mounting substrate 448 with the oscillating mirror 460. The mounting substrate 448 is omitted from FIGS. 1, 16, 17.

In the module of the first embodiment, two oscillating mirror substrates 440 are arranged back-to-back and supported integrally.

A supporting member 445 is resin molded, and located at a predetermined position on a circuit board 449. The supporting member 445 includes a positioning part 451 integrally combined with an edge connector part 452. The edge connector part 452 includes an arrangement of metal terminals. The positioning part 451 positions the oscillating mirror substrates 440 so that the mirror surfaces are parallel to each other, the torsion beams 442 are orthogonal to a main scanning plane, and the mirror surfaces are slanted at a predetermined angle (in this example, 30 degrees) with respect to the main scanning direction. A distributing terminal 455 is formed on one side of the mounting substrate 448 of the oscillating mirror substrate 440. The distributing terminal 455 contacts the edge connector part 452 when the oscillating mirror substrates 440 are attached to the supporting member 445.

In the first embodiment, the supporting member 445 and the circuit board 449 are separate members; however, either one can also serve as the other.

When the oscillating mirror substrate 440 is attached to the supporting member 445, one side of the oscillating mirror substrate 440 is inserted to the edge connector part 452, and the oscillating mirror substrate 440 is fit inside a pressing claw 453. Further, the backsides of the oscillating mirror substrates 440 are supported along the positioning part 451. The oscillating mirror substrate 440 is electrically coupled with the supporting member 445 when attached. Each of the oscillating mirror substrates 440 can be individually replaced.

On the circuit board 449, a control IC and a crystal oscillator are mounted to configure a driving circuit for the oscillating mirror 460. The circuit board 449 includes a connector 454 through which power is supplied and control signals are input/output.

Amplitude phases of the oscillating mirrors 460 are shifted by ½ period so that the scanning directions are aligned, even when the directions of deflection are opposite.

The circuit board 449 includes tabular transmitting windows 459 functioning as window members for transmitting light beams incident on and reflected from the oscillating mirrors 460. A cover 467 functioning as a sealing member molded with a highly heat-resistant material is fitted on the circuit board 449 from above, thereby sealing the attachment part of the oscillating mirrors 460.

Each of the transmitting windows 459 is slanted at an angle of approximately 5 degrees in the sub scanning direction with respect to the surfaces of the oscillating mirrors 460, so that light beams are not repeatedly reflected by the oscillating mirrors 460.

The cover 467 includes a cover body 467a covering the entire top surface of the circuit board 449, and an oscillating mirror covering part 467b protruding from the center part of the cover body 467a. The oscillating mirror covering part 467b specifically covers the part around the oscillating mirrors 460.

At the top of the oscillating mirror covering part 467b is provided an air pressure adjusting valve 456, which is a laminated air pressure adjusting part that is fixed at one side and opens to the outside. When internal pressure is higher than external pressure the valve opens, and when internal pressure is lower than external pressure the valve closes, to ensure that internal pressure is lower than external pressure.

In the first embodiment, the cover 467 is made of a resin material having a thermal conductivity less than or equal to 0.5 W/m·K, such as PPS resin.

Figure 3:
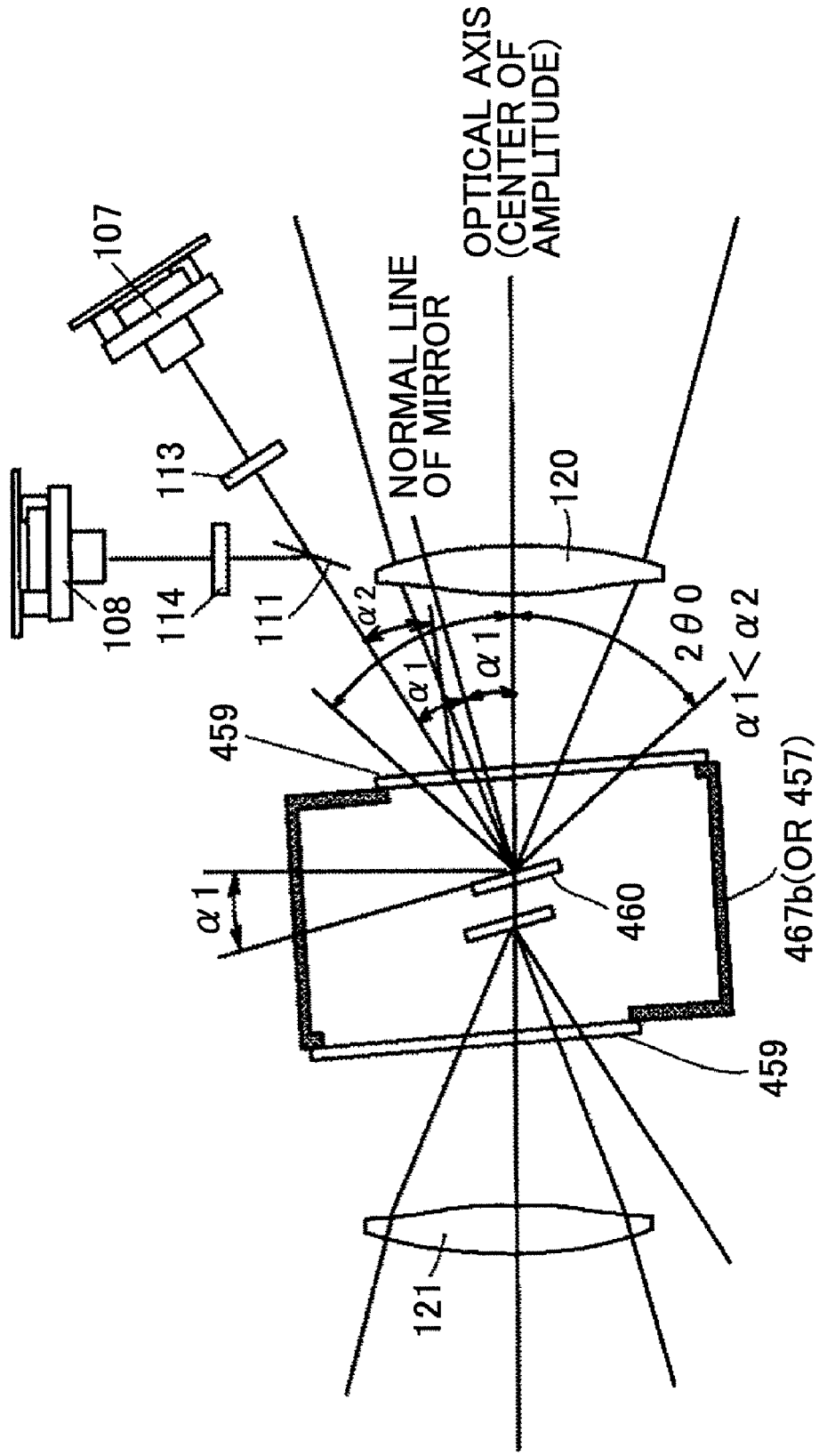
FIG. 3 is a cut-away view of an oscillating mirror and transmitting windows taken along a direction orthogonal to the rotational axis (torsion beam)

FIG. 3 is a cut-away view of the oscillating mirror 460, the transmitting windows 459, etc., taken along a direction orthogonal to the rotational axis (torsion beam 442).

A relationship between an incident angle α1 and an incident angle α2 is expressed below. The incident angle α1 is an angle in the main scanning direction between a light beam from one of the light source units incident on the oscillating mirror 460 (more precisely the movable mirror 441) and a normal line of the oscillating mirror 460. The incident angle α2 is an angle in the main scanning direction between the light beam and a normal line of the transmitting window 459.

$$\alpha1 < \alpha2 \leq \alpha2\alpha1$$

The angle of the transmitting window 459 is determined to appropriately prevent loss of light quantity in a single light path and minimize inconsistencies in light quantities along the main scanning direction corresponding to the oscillation angles. The angle of the transmitting window 459 is determined based on transmittance when a light beam from one of the light source units passes through the transmitting window 459, reflectance of the oscillating mirror 460 with respect to the oscillation angles, and transmittance when a light beam deflected by the oscillating mirror 460 passes through the transmitting window 459.

Figure 4:
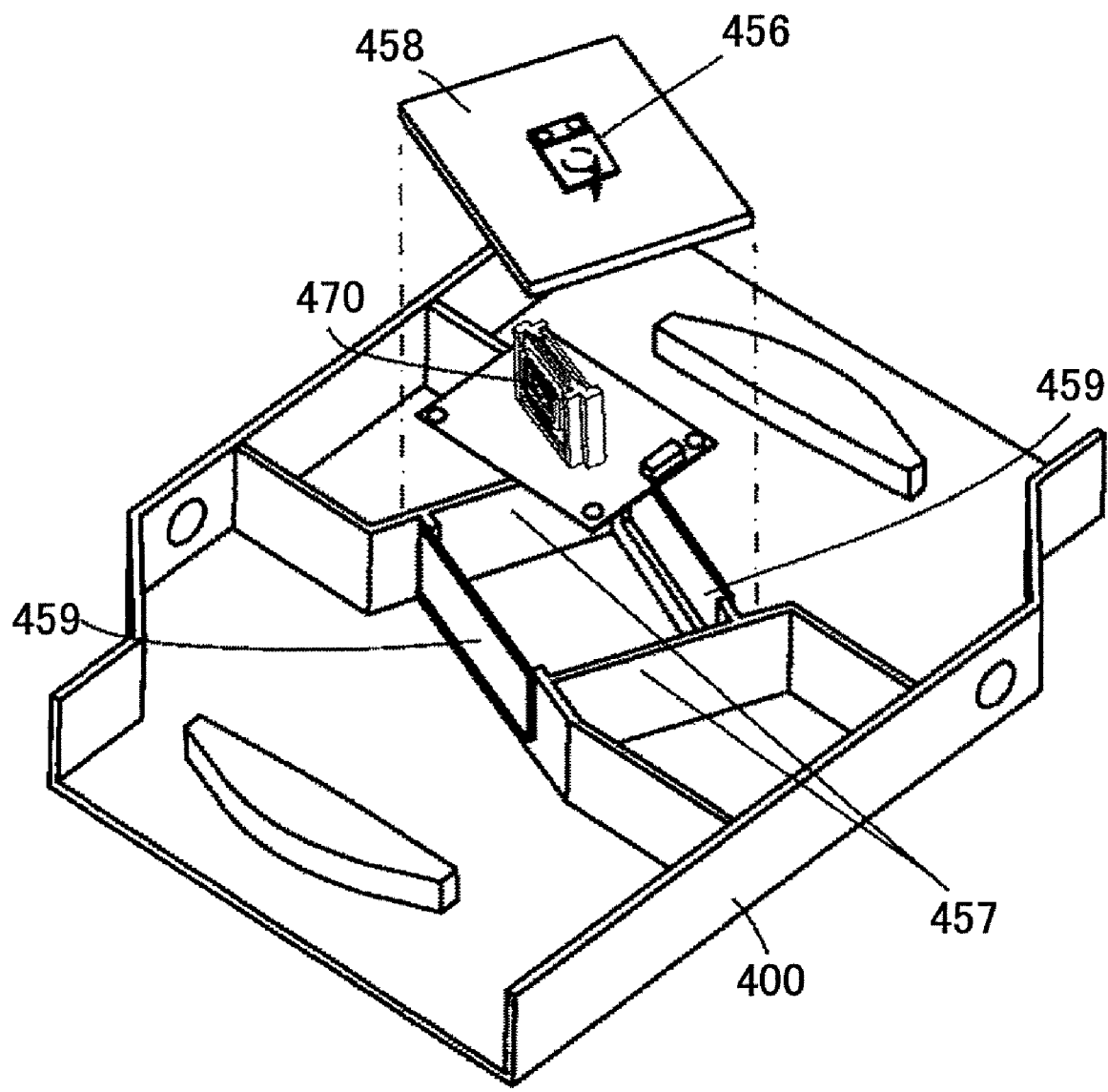
FIG. 4 is an exploded perspective view of the oscillating mirror module that is attached to an optical housing.

The cover 467 can be integrally formed with an optical housing functioning as a housing part in which the oscillating mirror module is installed. For example, as shown in FIG. 4, the purpose of the cover 467 can be fulfilled by providing side walls 457 surrounding an oscillating mirror module 470 in an optical housing 400, and a top cover 458 for sealing the top edges of the side walls 457. In this case, a sealing member is configured by the side walls 457 and the top cover 458.

If heat insulating properties of the side walls 457 and the top cover 458 are low, it is possible to attach foamed polyurethane with high heat insulating properties or apply a coating of silicon resin in order to block heat flow.

The oscillating mirror 460 is arranged so that the center of the rotational axis thereof meets the intersection point of a light beam from a light source unit and a light axis of an imaging optical system. Assuming that the angle between a light beam from the light source unit and the light axis of the imaging optical system, i.e., an average incident angle, is α, and an oscillation angle (amplitude phase) is θ0, the normal line of the oscillating mirror 460 surface is arranged at an angle of substantially α/2+θ0 in the main scanning direction with respect to a light beam from the light source unit.

In the first embodiment, α/2>θ0, and α=70°, θ0=25°.

Assuming that the scanning angle is θs, the transmitting window 459 is arranged such that the normal line thereof is slanted at an angle of substantially α/2+θd in the main scanning direction with respect to a light beam from the light source unit. In this example, θd=15°.

The oscillating mirror substrate 440 is described in detail with reference to FIGS. 5A, 5B, 5C, and FIG. 6 (exploded perspective view).

The oscillating mirror 460 includes a movable part functioning as an oscillator with a mirror on the surface thereof, torsion beams supporting the movable part and functioning as a rotational axis, and a frame functioning as a supporting part. The oscillating mirror 460 is cut out from a Si substrate by etching.

Figure 5A:
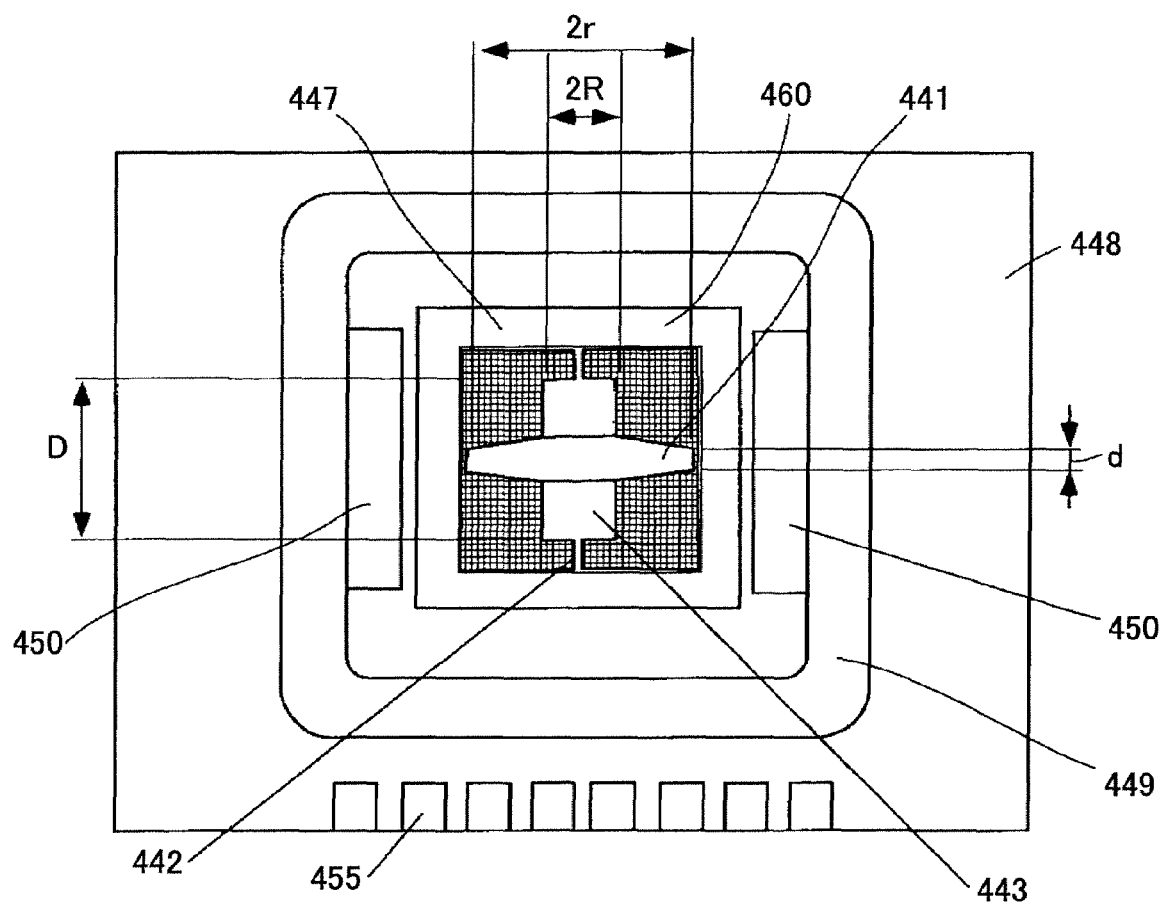
FIGS. 5A, 5B, 5C are diagrams of an oscillating mirror substrate, where
Figure 5B:
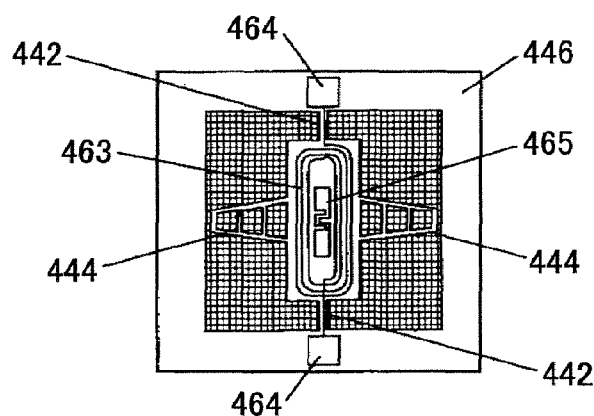
Figure 5C:
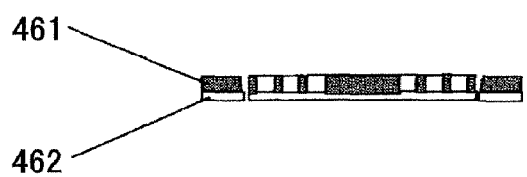
Figure 6:
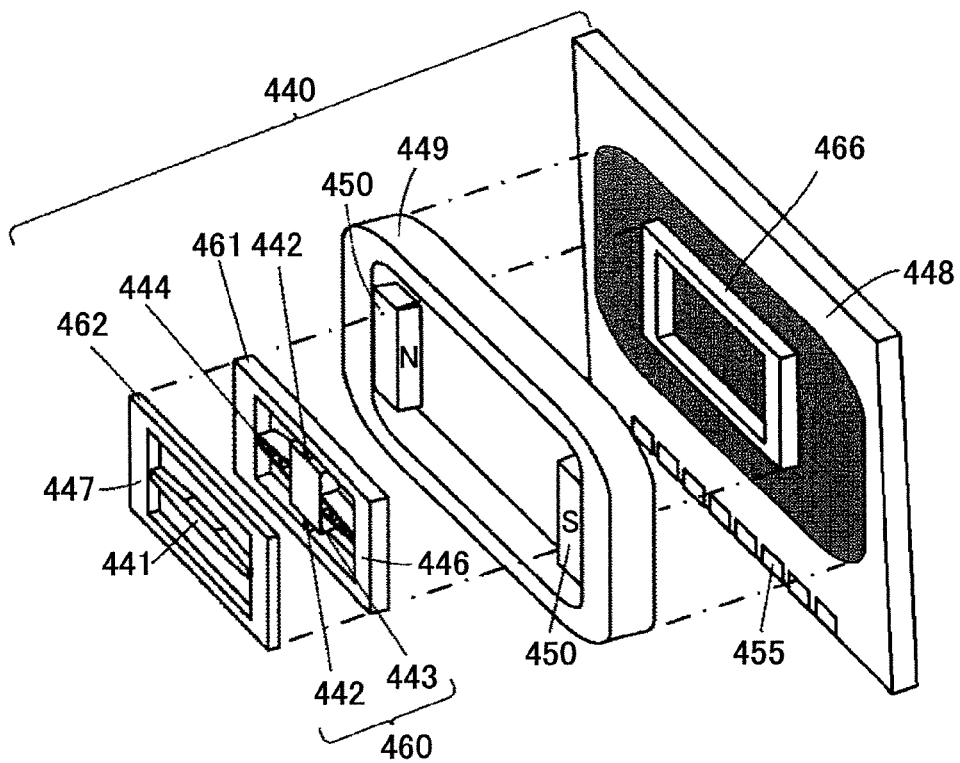
FIG. 6 is an exploded perspective view of the oscillating mirror substrate.

In the first embodiment, as shown in FIG. 5C, the oscillating mirror 460 is fabricated by using a wafer. This wafer is formed in advance by bonding together two substrates called SOI substrates of thicknesses 60 μm and 140 μm, with an oxide film sandwiched therebetween.

First, a 140 μm substrate (second substrate) 461 is perforated from the surface down to the oxide film by a dry process employing plasma etching, at portions excluding the torsion beam 442, an oscillating board 443 on which a planar coil is formed, reinforcing beams 444 functioning as backbones of the movable part, and a frame 446.

Next, a 60 μm substrate (first substrate) 462 is perforated from the surface up to the oxide film by anisotropic etching using such as KOH, at portions excluding the movable mirror 441 and a frame 447. Last, the oxide film around the movable part is removed and separated, thereby forming the structure of the oscillating mirror 460.

The widths of the torsion beams 442 and the reinforcing beams 444 are 40 μm to 60 μm. As described above, in order to obtain a large oscillation angle, the moment of inertia I of the oscillator is preferably small. In addition, inertial force causes the mirror surface to deform. Accordingly, the movable part is thinned down (made thin) in the first embodiment.

Further, an aluminum thin film is applied by vapor deposition on the surface of the 60 μm substrate 462, thereby forming a reflection surface. As shown in FIG. 5B, on the surface of the 140 μm substrate 461 are provided a coil pattern 463 formed with a copper film as a planar coil, terminals 464 wired via the torsion beams 442, and a patch 465 for trimming.

As a matter of course, a permanent magnet in the form of a thin film can be provided on the oscillating board 443 side, and a planar coil can be provided on the frame 447 side.

On the mounting substrate 448 are mounted a frame-shaped pedestal 466 for attaching the oscillating mirror 460 and a yoke 449 surrounding the oscillating mirror 460. A pair of permanent magnets 450 is bonded to the yoke 449, facing the edges of the movable mirror 441 such that the S pole of one magnet faces the N pole of the other, thereby generating a magnetic field in a direction orthogonal to the rotational axis.

The oscillating mirror 460 is attached to the pedestal 466, with the mirror surface facing outward. A current is applied between the terminals 464 so that a Lorentz force is generated at sides parallel to the rotational axis of the coil pattern 463, and a rotational torque T for rotating the movable mirror 441 by twisting the torsion beams 442 is generated. When the current is turned off, the movable mirror 441 returns to a horizontal status due to a return force of the torsion beams 442.

Accordingly, by alternately switching the direction of the current applied to the coil pattern 463, the movable mirror 441 can be oscillated back and forth.

It is possible to excite the amplitude and obtain a large oscillation angle by switching the current by a period near a specific frequency of a primary oscillation mode of the structure of the oscillating mirror 460 with the torsion beams 442 functioning as the rotational axis, i.e., the resonant frequency f0.

Thus, under normal circumstances, a scanning frequency fd is set to match the resonant frequency f0, or controlled to follow the resonant frequency f0. However, as described above, the resonant frequency f0 is determined by the moment of inertia I of the oscillator included in the oscillating mirror 460. Accordingly, if precision of finished dimensions where to vary, resonance frequencies f0 would vary between individual oscillating mirrors. Therefore, when plural oscillating mirrors are employed as in the first embodiment, it is difficult to make the scanning frequencies fd be consistent.

The resonance frequencies f0 vary by about 200 Hz, although this range depends on the performance of the process. For example, with a scanning frequency fd=2 kHz, the scanning line pitch becomes displaced by 1/10 line. In this case, when 10 lines are recorded, the scanning position becomes displaced by one whole line.

To overcome this problem, it is possible to select oscillating mirrors having similar resonance frequencies f0 and combining them together. However, with such a method, production efficiency is low and costs are high because the oscillating mirrors have to be replaced in pairs.

In the first embodiment, before attaching the oscillating mirror 460 to the mounting substrate 448, notches are formed in the patch 465 behind the movable part with a carbon dioxide gas laser to gradually reduce the mass of the movable part for adjusting the moment of inertia I. Accordingly, even if there are differences in dimensions between the individual oscillating mirrors 460, resonance frequencies f0 thereof are controlled to substantially match. In the first embodiment, the adjustments are made so that the resonance frequencies f0 vary within a range of ±50 Hz.

The scanning frequency fd is set within this frequency band width, regardless of the resonant frequency f0.

Figure 7:
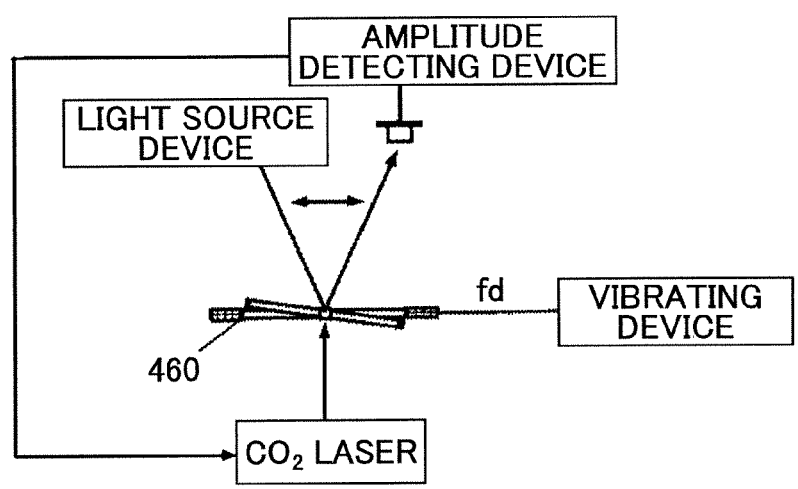
FIG. 7 is a diagram illustrating adjustment of resonant frequency by changing mass of the oscillating mirror.

FIG. 7 is a diagram illustrating adjustment of the resonant frequency by changing mass (trimming).

The oscillating mirror 460 receives an oscillation corresponding to a scanning frequency from a vibrating device, a carbon dioxide gas laser is irradiated onto the patch 465 from behind the oscillating mirror 460, and notches are formed until the oscillation angle rapidly increases due to resonance.

The resonance status is detected by irradiating a light beam onto the front of the oscillating mirror 460 from a light source device, and detecting oscillation of the reflection of the light beam with an amplitude detecting device.

The mass can be changed not only by reducing the mass by trimming, but also by attaching balance weights to the oscillating mirror 460 to increase the mass.

Figure 8:
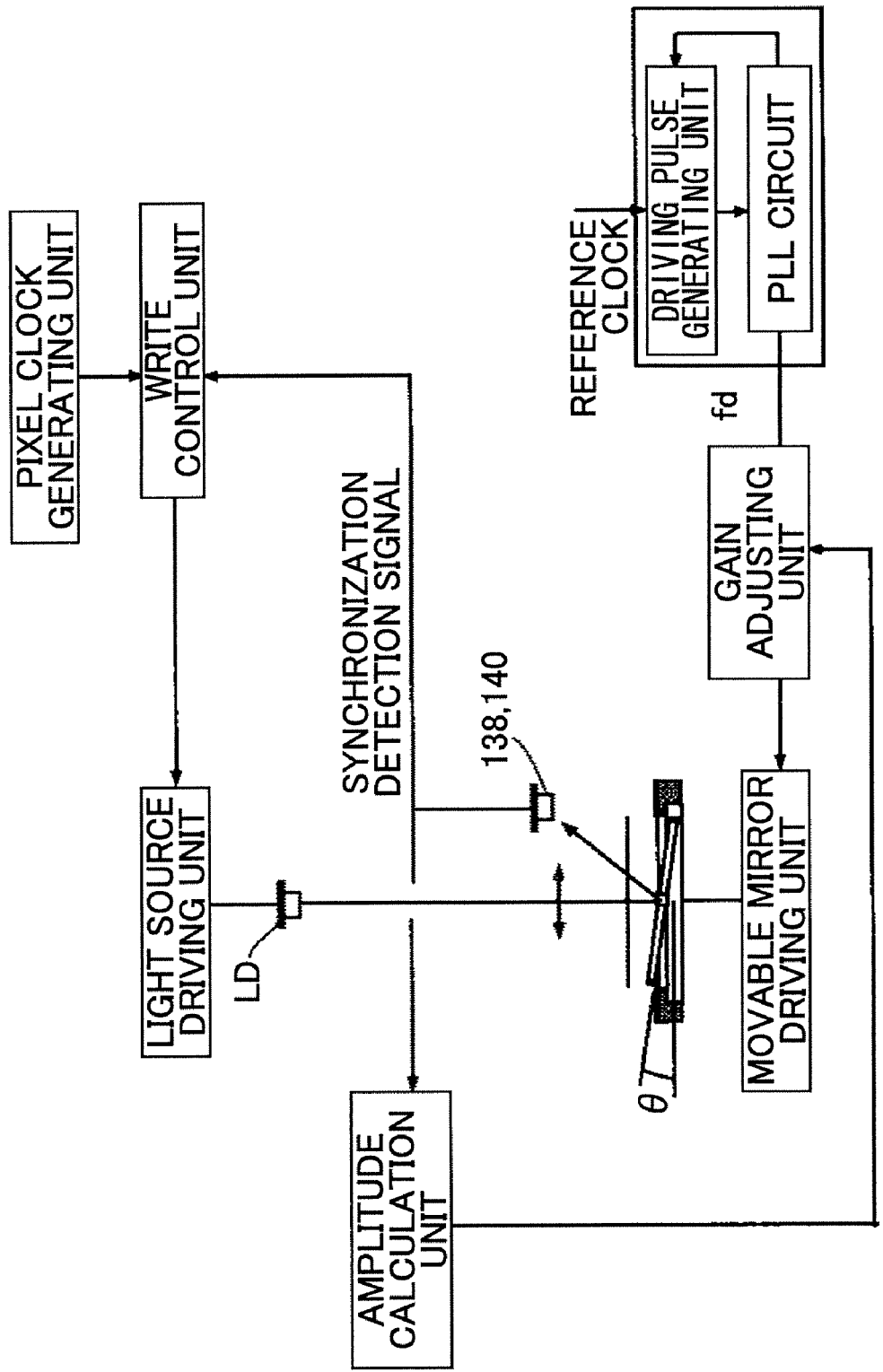
FIG. 8 is a block diagram of a driving circuit for oscillating the oscillating mirror.

FIG. 8 is a block diagram of a driving circuit for oscillating the oscillating mirror 460. As described above, on the planar coil (coil pattern 463) formed on the backside of the oscillating mirror 460, an alternating voltage or a pulse-waved voltage is applied in such a manner that the current alternately changes direction. Further, the gain of the current applied to the planar coil is adjusted so that the oscillation angle θ is constant. Accordingly, the oscillating mirror 460 is oscillated back and forth.

Figure 9:
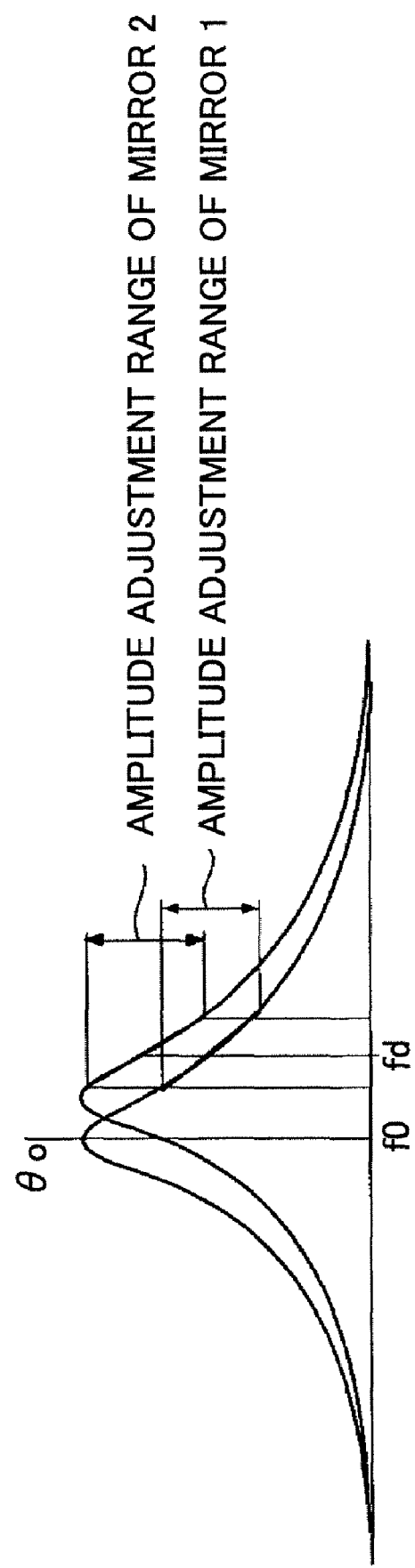
FIG. 9 is a graph illustrating the relationship between a frequency for switching the direction of a current and an oscillation angle.

FIG. 9 is a graph illustrating the relationship between a frequency f for switching the direction of the current and the oscillation angle θ. Generally, when the frequency property is such that the resonant frequency f0 is at the peak and the scanning frequency fd matches the resonant frequency f0, the oscillation angle can be maximized. However, the oscillation angle changes rapidly near the resonant frequency.

Thus, a driving frequency applied to a fixed electrode at a driving unit (oscillating mirror driving part) of the movable mirror 441 can be initially set to match the resonant frequency. However, this method disadvantageously lacks stability with the passage of time. Specifically, when the resonant frequency changes due to variations in the spring rate caused by temperature fluctuations, the oscillation angle rapidly decreases.

Therefore, in the first embodiment, the scanning frequency fd is fixed at a single frequency separated from outside the resonant frequency f0, and the oscillation angle θ can be increased/decreased according to gain adjustment.

Specifically, with respect to the resonant frequency f0=2 kHz, the scanning frequency fd is 2.5 kHz, and the oscillation angle θ is controlled to be within ±25° by gain adjustment.

With the passage of time, the oscillation angle θ is controlled to be constant by detecting a light beam scanned by the oscillating mirror 460 based on the time difference between a detection signal detected during backward scanning and a detection signal detected during forward scanning, which detection signals are detected by the synchronization sensors 138, 140 arranged at the starting edges of the scanning areas.

Figure 10:
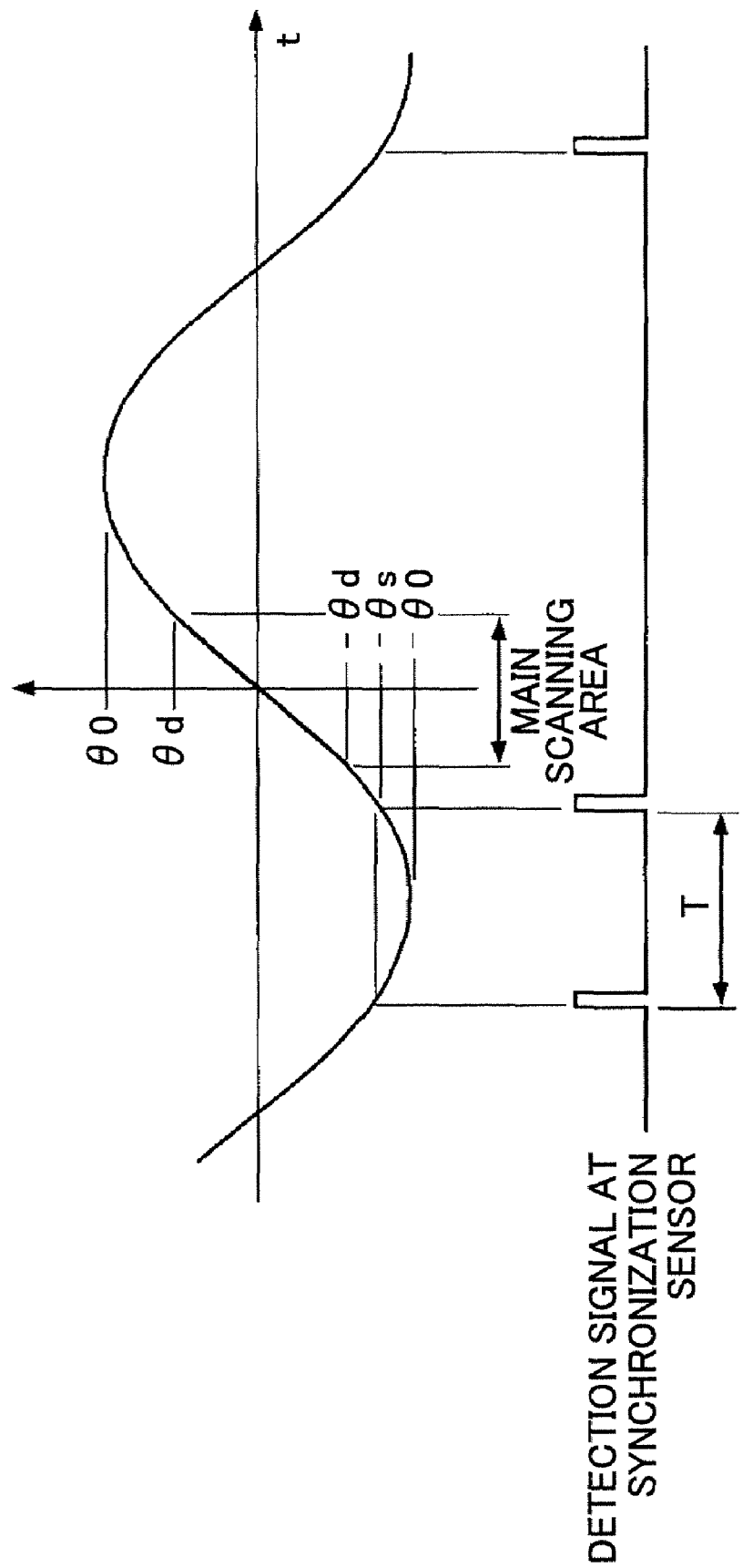
FIG. 10 is a graph illustrating changes of a scanning angle caused by a resonant frequency of the oscillating mirror.

As shown in FIG. 10, the oscillating mirror 460 is oscillated by a resonant frequency, so that a scanning angle θ forms a sine-wave shape with the passage of time t. The following equation is satisfied, where the maximum oscillation angle of the oscillating mirror 460, i.e., the amplitude is θ0.

$$\theta = \theta 0 \cdot \sin 2\pi fd \cdot t$$

When the synchronization sensors 138, 140 detect a light beam corresponding to a scanning angle of 2θs, and a time difference T between detection signals of backward scanning and forward scanning is obtained, the following equation is satisfied.

$$\theta s = \theta 0 \cos 2\pi fd \cdot T/2$$

Because θs is fixed, the maximum oscillation angle θ0 can be determined by measuring T.

On the photoconductive drum surface, which is the scan object surface, main scanning dots need to be formed such that intervals between pixels are equal with respect to time.

Figure 11:
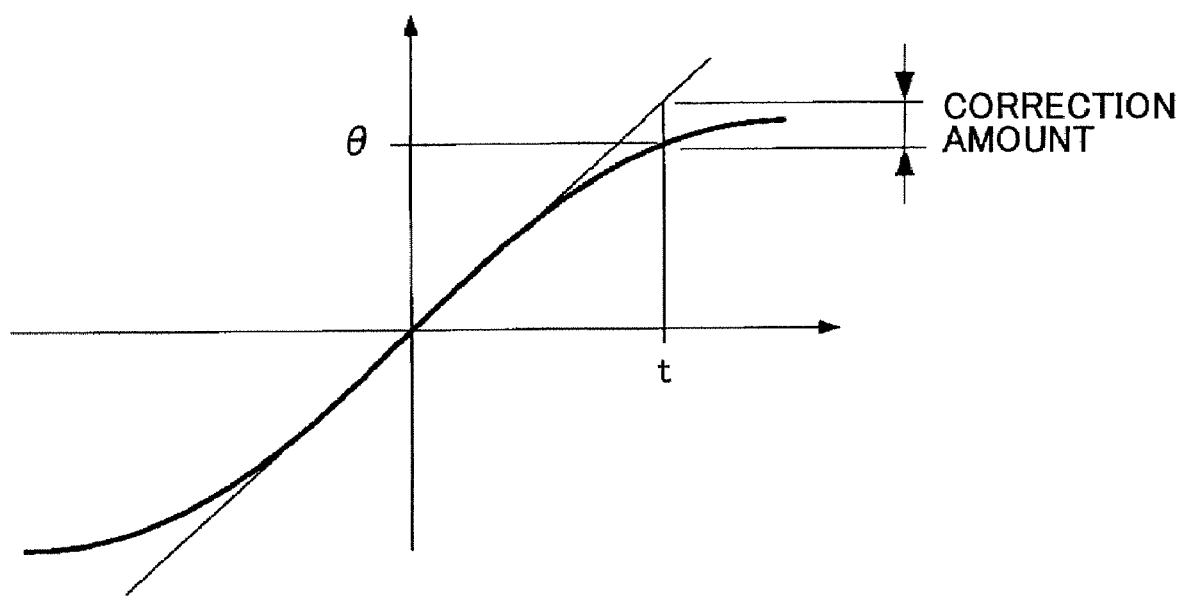
FIG. 11 is a graph illustrating changes of an oscillation angle of the oscillating mirror with the passage of time.

As shown in FIG. 11, in the oscillating mirror 460, the rate of change of the oscillation angle θ becomes acceleratingly small with the passage of time. Therefore, the closer to both edges of the main scanning area on the scan object surface, the wider the pixel intervals. Generally, this displacement is corrected by using an f·arcsin lens. However, when the pixel clock is modulated at a single frequency, similarly to scanning with a polygon mirror, in order to control the scanning angle 2θ to be proportional to time, i.e., to change at a uniform speed, the power (refracting power) along the main scanning direction needs to be set so that the correction amount of the main scanning positions at the edges of the main scanning area are maximum.

In this case, a relationship between an arbitrary image height H and an oscillation angle θ (scanning angle 2θ) is expressed by the following equation, where time t is the time from an image height 0, i.e., from the center of an image, to the image height H.

$$H = \omega \cdot t = (\omega/2\pi fd) \cdot \sin^{-1}(\theta/\theta 0)$$

where ω is a constant.

However, when the correction amount of density of pixel intervals, i.e., linearity increases, deviation of power of the scanning lens in the main scanning direction increases. This largely changes beam spot diameters corresponding to the pixels on the scan object surface.

In the first embodiment, by making a phase Δt of a pixel clock variable according to the main scanning position, the deviation of power of the scanning lens in the main scanning direction is minimized.

The following relational expressions are satisfied, where the scanning angle changes by 2Δθ by making the phase θt of the pixel clock variable.

$$H = (\omega/2\pi fd) \cdot \sin^{-1}\{(\theta - \Delta\theta)/\theta 0\}$$

$$\Delta\theta/\theta 0 = \sin 2\pi fdt - \sin 2\pi fd(t - \Delta t)$$

When the power distribution of the scanning lens is approximated to that of the fθ lens, and the residual thereof is corrected by the phase Δt of the pixel clock, the following relational expressions are satisfied.

$$H = (\omega/2\pi fd) \cdot \{(\theta - \Delta\theta)/\theta 0\}$$
$$= (\omega/2\pi fd) \cdot \sin^{-1}(\theta/\theta 0)$$
$$\Delta\theta/\theta 0 = \theta/\theta 0 - \sin^{-1}(\theta/\theta 0)$$

A light source is to be modulated such that a phase Δt(sec) of a predetermined pixel in the main scanning direction is determined by the following relational expression.

$$(\theta/\theta 0) - \sin^{-1}(\theta/\theta 0) = \sin 2\pi fdt - \sin 2\pi fd(t - \Delta t)$$

Figure 12:
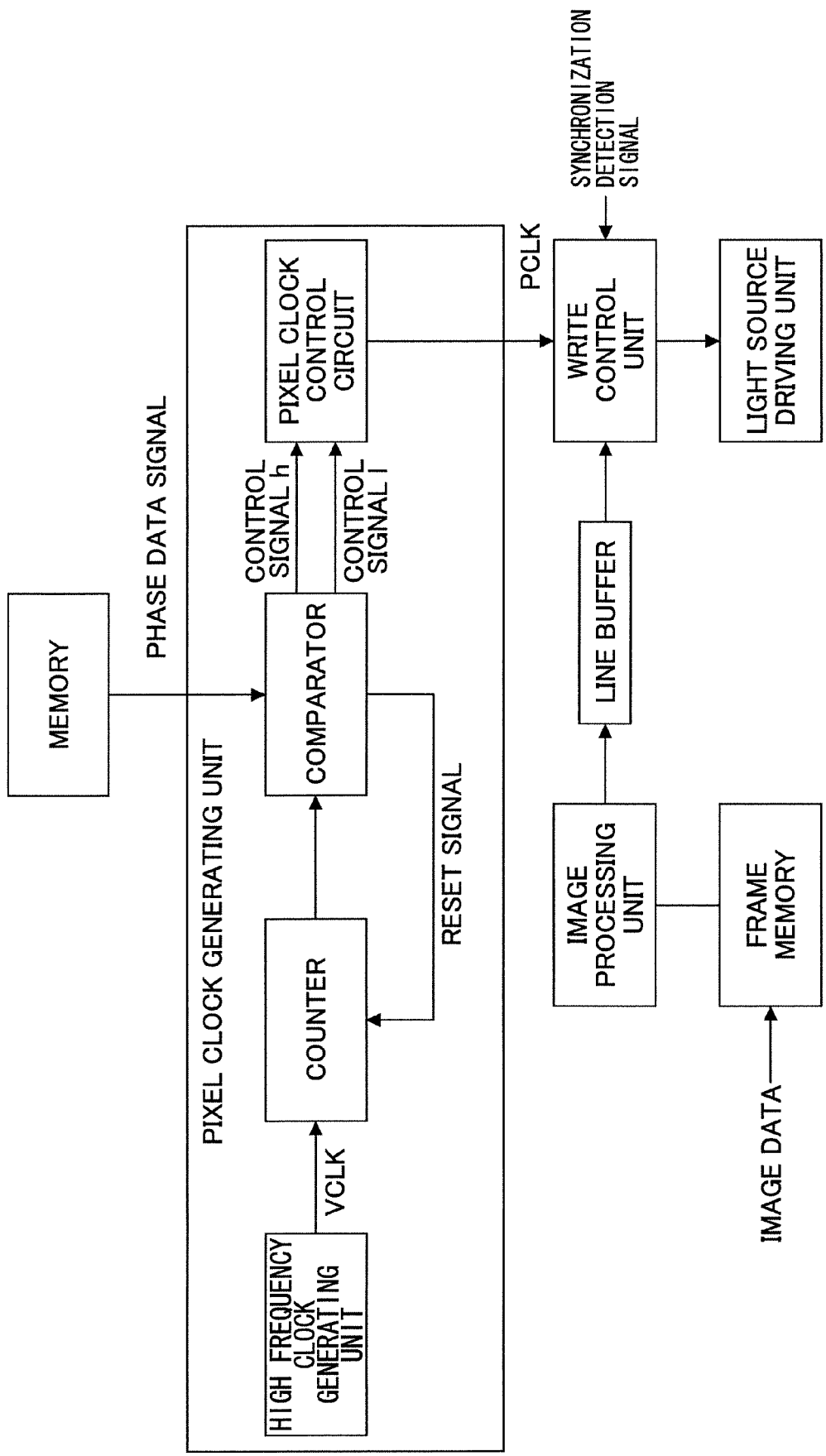
FIG. 12 is a block diagram of a driving circuit for modulating a semiconductor laser functioning as a light source.

FIG. 12 is a block diagram of a driving circuit for modulating a semiconductor laser functioning as one of the light source units 107, 108, 109, 110.

Image data are raster expanded according to each color and temporarily saved in a frame memory. An image processing unit sequentially reads the image data, pixel data for each line are formed according to matrix patterns corresponding to halftones with reference to preceding and following relationships, and the pixel data are transferred to line buffers corresponding to the light source units.

A write control unit reads synchronization detection signals as triggers from the line buffers, and modulates the signals independently of each other.

A description is given of a clock generating unit (pixel clock generating unit) for modulating the light emission points. A counter counts a high frequency clock VCLK generated by a high frequency clock generating unit. A comparator compares the count value with a set value L specified in advance based on a duty ratio and phase data H received from outside as transition timing of the pixel clock for directing a phase shift amount. When the count value matches the set value L, the comparator outputs a control signal 1 directing the pixel clock PCLK to fall. When the count value matches the phase data H, the comparator outputs a control signal h directing the pixel clock PCLK to rise. At the same time as the control signal h is output, the counter is reset and the counter starts counting from 0 again, thereby forming a continuous pulse train.

The phase data H are given for every clock, thereby sequentially generating pixel clocks PCLK whose pulse frequencies are varied. The pixel clock PCLK corresponds to a ⅛ frequency division of the high frequency clock VCLK, so that the phase is variable by a resolving power of ⅛ clock.

Figure 13:
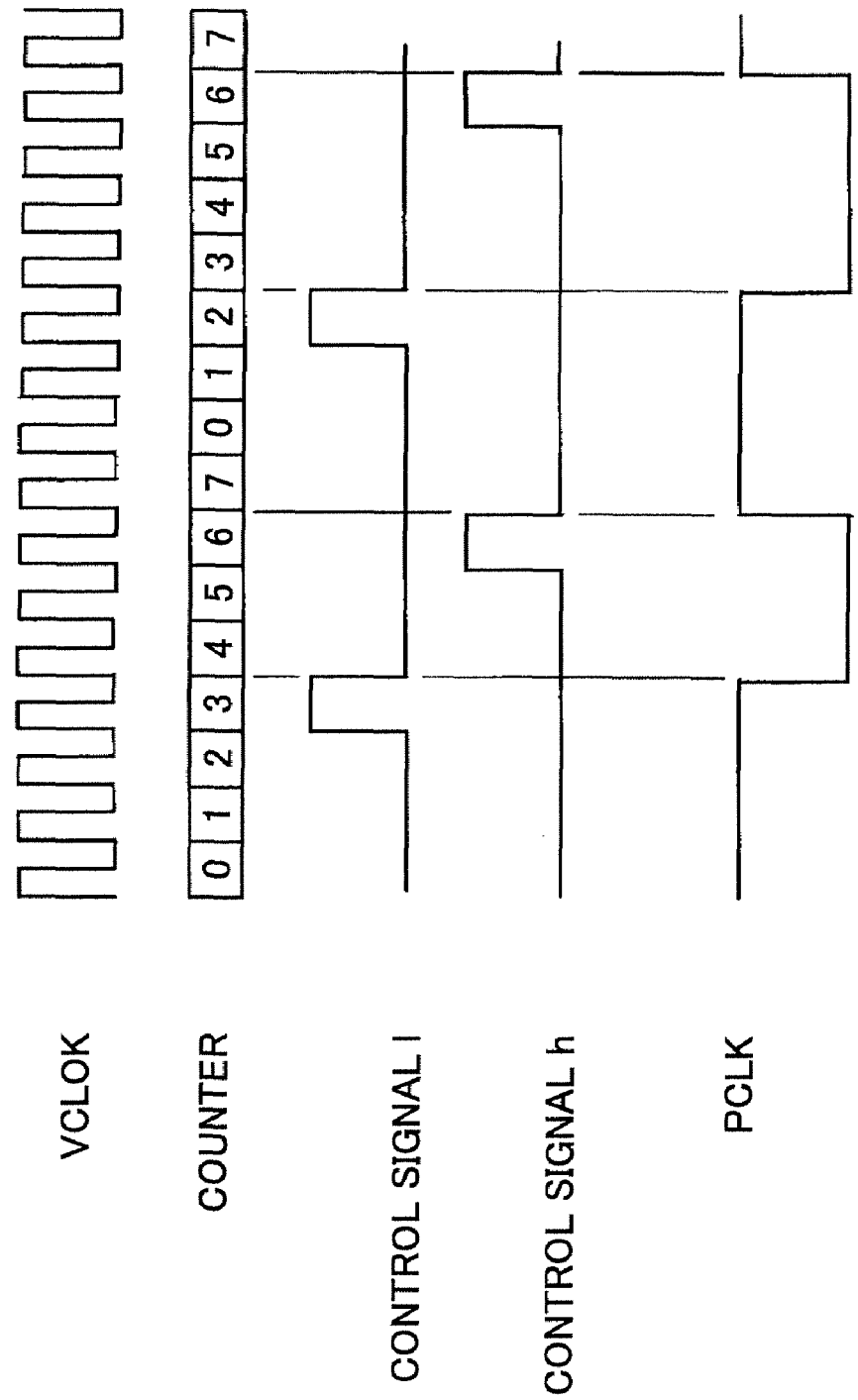
FIG. 13 is a diagram illustrating shifts of phases of an arbitrary pixel.

FIG. 13 is a diagram illustrating shifts of phases of an arbitrary pixel where the phase is delayed by ⅛ clock.

Assuming that the duty is 50%, a set value L=3 is given, and the pixel clock PCLK is made to fall when the counter counts to four. If the phase is delayed by ⅛ clock, phase data H=6 is given, and the pixel clock PCLK is made to rise when the counter counts to seven. At the same time, the counter is reset, so that the pixel clock PCLK is made to fall again when the counter counts to four. Accordingly, an adjacent pulse frequency is shortened by ⅛ clock.

The pixel clock PCLK thus generated is transferred to a light source driving unit, and the light source driving unit drives the semiconductor laser based on modulated data in which pixel data read from line buffers are superposed on pixel clocks PCLK.

Figure 14:
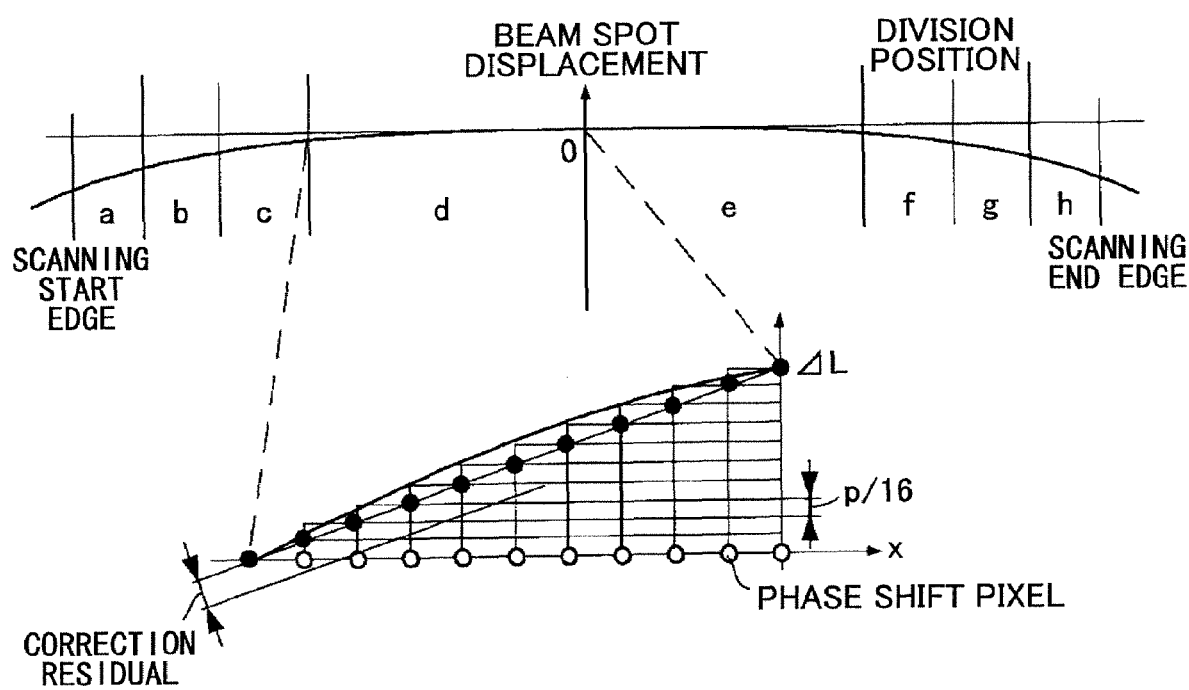
FIG. 14 illustrates correction amounts of main scanning positions of pixels when modulated by a single frequency.

FIG. 14 illustrates correction amounts of main scanning positions of pixels when modulated by a single frequency. The main scanning area is divided into plural areas (eight areas in the first embodiment). A number of times of phase shifts is specified for each area so that displacements of main scanning positions are made zero at boundaries of the areas by approximation with a line of a line graph, and corrections are made in a stepwise manner.

For example, the following equation is satisfied where the number of pixels in an area i is Ni, the shift amounts of the pixels are in units of 1/16 of a pixel pitch p, and a displacement of a main scanning position at both edges of each area is ΔLi.

$$ni = Ni \cdot p / 16 \Delta Li$$

Therefore, the phase is to be shifted for every ni pixels.

The total phase difference Δt is obtained by the following equation, where the pixel clock is fc, and the number of phase shifts is Ni/ni.

$$\Delta t = 1/16 fc \times \int (Ni/ni) di$$

Thus, the total phase difference Δt of the pixel at the Nth dot can be specified according to accumulated number of phase shifts.

The divided areas can be equal or unequal, and the main scanning area can be divided into any number of areas. However, if the shift amounts of the pixels become large, the difference becomes conspicuous in the image. Therefore, the unit of the shift amounts of the pixels is preferably less than or equal to ¼ of a pixel pitch p. If the phase shift amount becomes small, the number of phase shifts increases, thereby increasing the amount of memory required. The memory requirement can be reduced by dividing the main scanning area into a small number of areas. It is therefore efficient to reduce the width of an area where displacements of main scanning positions are large, and extend the width of an area where displacements of main scanning positions are small.

Figure 15:
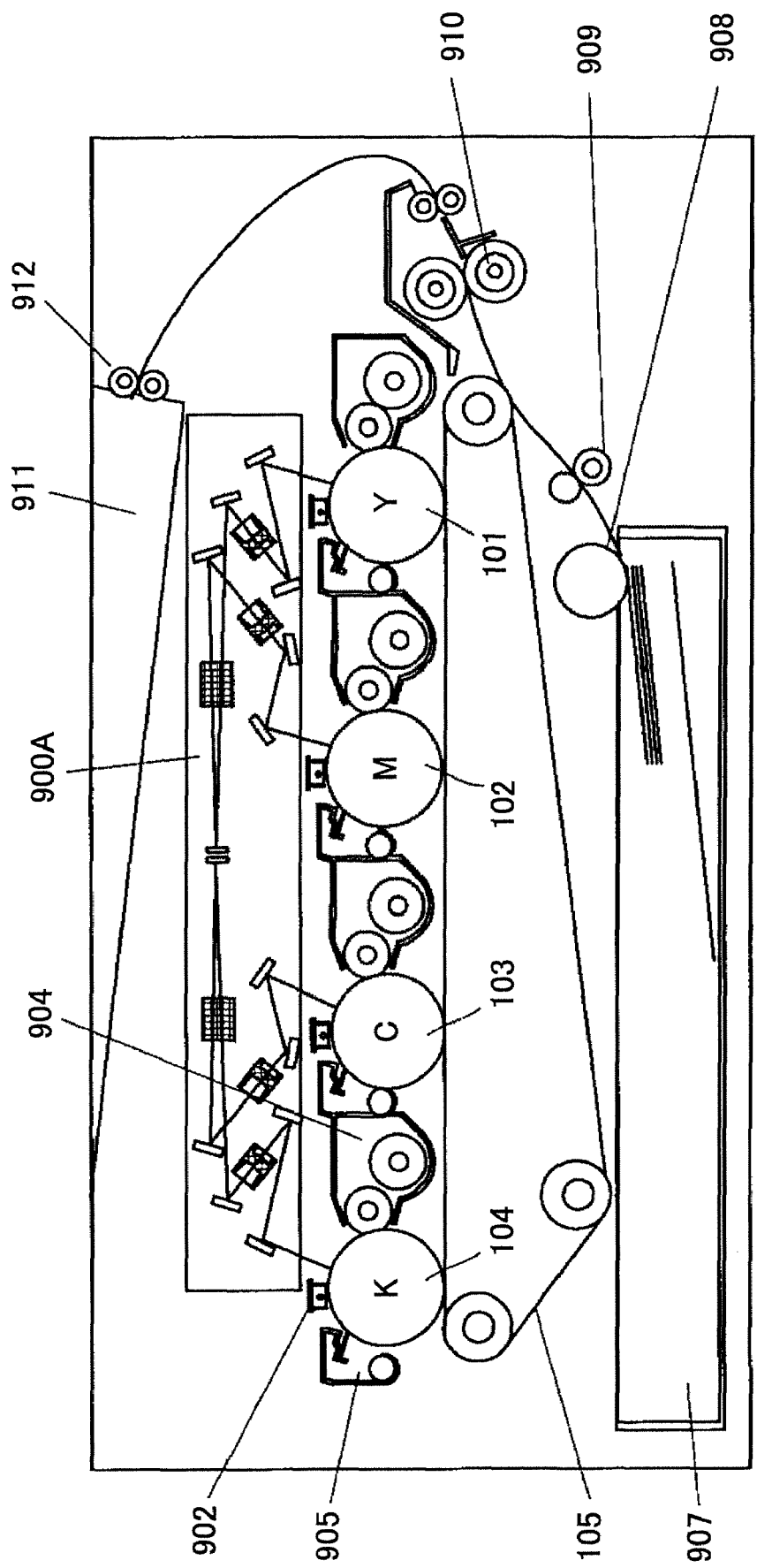
FIG. 15 is a side view of an image forming apparatus including the optical scanning device shown in FIG. 1.

FIG. 15 is a side view of an image forming apparatus including the optical scanning device 900A shown in FIG. 1.

Around the black photoconductive drum 104, there are arranged an electric charger 902 for charging the photoconductive drum to high voltage, a developing device 904 for making visible an electrostatic latent image recorded by the optical scanning device 900A by applying charged toner thereto, and a cleaning device 905 for scraping off toner remaining on the photoconductive drum and saving the toner. The other photoconductive drums are also surrounded by the same components, each set of components configuring an image forming station. The oscillating mirror scans the photoconductive drum back and forth, thereby recording an image of two lines per period.

The above described image forming stations are juxtaposed to each other in the direction of movement of the intermediate transfer belt 105. Toner images of yellow, magenta, cyan, and black are sequentially transferred onto the intermediate transfer belt 105 from the image forming stations at appropriate timings so as to be superposed on each other, thereby forming a full-color image. The image forming stations basically have the same structures, except for the color of toner.

Recording paper functioning as recording media is supplied from a paper feeding tray 907 by a paper feeding roller 908. The recording paper is sent out to the intermediate transfer belt 105 by a pair of registration rollers 909 at a timing when recording starts in the sub scanning direction, so that a toner image is transferred from the intermediate transfer belt 105 onto the recording paper. Subsequently, the image is fixed onto the recording paper by a fixing device 910, and then a pair of paper discharge rollers 912 discharges the recording paper to a paper discharge tray 911.

Figure 16:
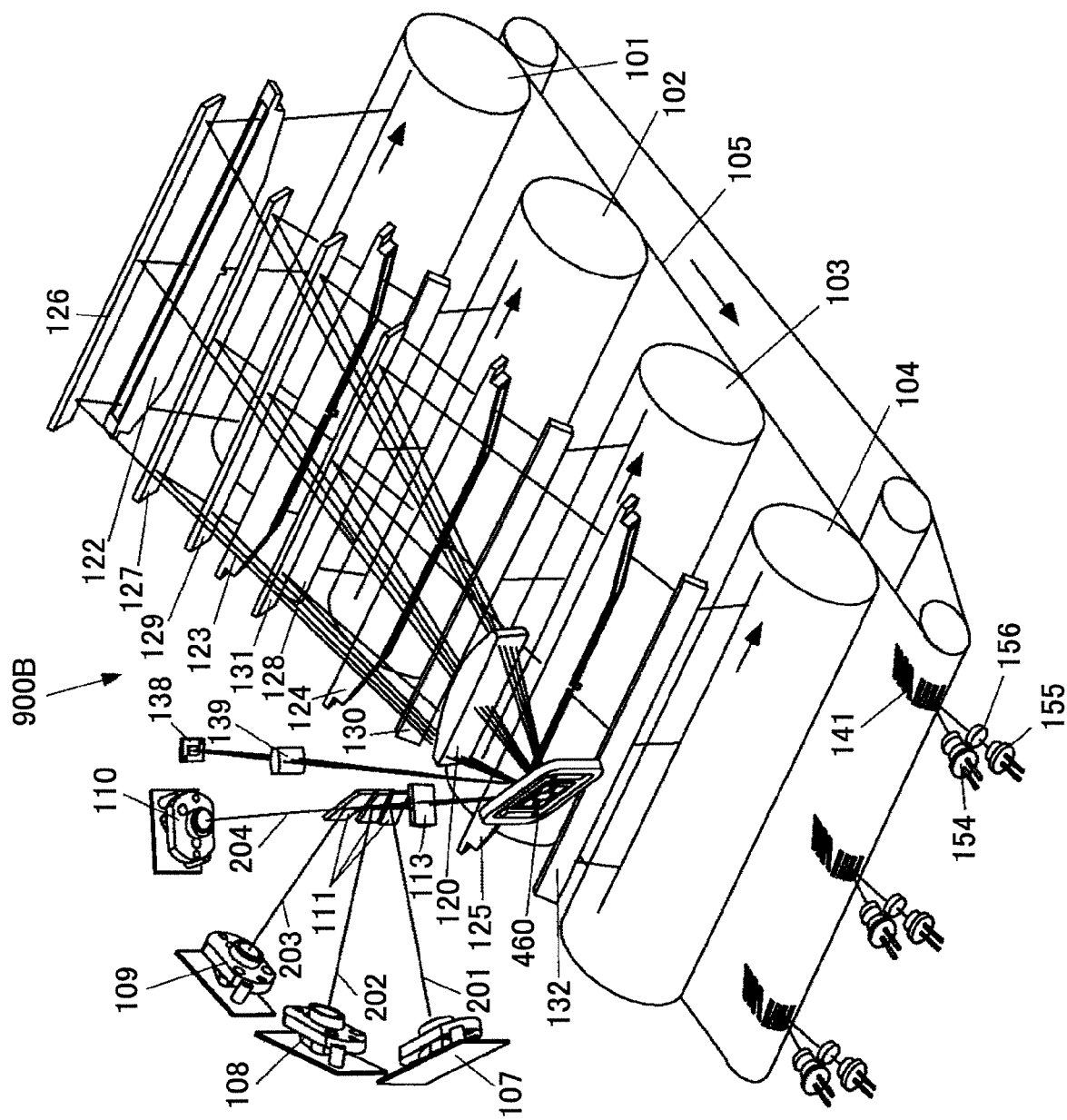
FIG. 16 is a perspective view of an optical scanning device according to a second embodiment of the present invention.

A second embodiment is described with reference to FIG. 16. Elements corresponding to those in the first embodiment are denoted by the same reference numbers, and configurations and functions thereof are not further described unless necessary, and only substantial parts are described.

In the second embodiment, four stations are scanned by using a single oscillating mirror 460.

Elements of an optical scanning device 900B for scanning the photoconductive drums 101, 102, 103, 104 are integrally provided. The four photoconductive drums 101, 102, 103, 104 are arranged along a direction of movement of the intermediate transfer belt 105 (direction indicated by arrow), with equal intervals therebetween. Light beams from the corresponding light source units 107, 108, 109, 110 are deflected at the oscillating mirror 460, then separated again, and guided to the corresponding photoconductive drums 101, 102, 103, 104 to simultaneously form images.

Light beams from the light source units 107, 108, 109, 110 are made obliquely incident on the oscillating mirror 460 at different incident angles. Accordingly, the light beams from the light source units 107, 108, 109, 110 are deflected at once, and caused to scan the photoconductive drums 101, 102, 103, 104 at once.

The light source units 107, 108, 109, 110 are radially arranged at different heights in the sub scanning direction. The light source unit 110 is positioned highest, and the others are sequentially positioned lower. The light beams 201, 202, 203 from the light source units 107, 108, 109 are reflected by three incident mirrors 111 of different heights, and are thereby aligned in descending order as the light beams 203, 202, 201. The light beam 204 from the light source unit 110 together with the light beams 201, 202, 203 are incident on the cylinder lens 113 at different heights in the sub scanning direction, and reach the oscillating mirror 460.

The cylinder lens 113 causes the light beams 201 through 204 to intersect each other in the sub scanning direction near the surface of the oscillating mirror 460. After the light beams 201 through 204 are deflected, intervals therebetween are extended so that they separate from each other, and are incident on the fθ lens 120.

The fθ lens 120 is shared by all of the stations, and does not have a convergence force in the sub scanning direction. Among the light beams from the light source units that have passed through the fθ lens 120, the light beam 201 from the light source unit 107 reflects off the return mirror 126, focuses as a spot on the photoconductive drum 101 via the toroidal lens 122, and forms a latent image based on yellow image information in the first image forming station.

The light beam 202 from the light source unit 108 reflects off the return mirror 127, focuses as a spot on the photoconductive drum 102 via the toroidal lens 123 and the return mirror 128, and forms a latent image based on magenta image information in the second image forming station.

The light beam 203 from the light source unit 109 reflects off the return mirror 129, focuses as a spot on the photoconductive drum 103 via the toroidal lens 124 and the return mirror 130, and forms a latent image based on cyan image information in the third image forming station.

The light beam 204 from the light source unit 110 reflects off the return mirror 131, focuses as a spot on the photoconductive drum 104 via the toroidal lens 125 and the return mirror 132, and forms a latent image based on black image information in the fourth image forming station.

A light beam deflected by the oscillating mirror 460 passes by the scanning lens 120, converges at the focusing lens 139, and is incident on the synchronization sensor 138. Based on detection signals, synchronization detection signals are generated for the stations.

The optical scanning device 900B can also be provided in an image forming apparatus, similarly to the optical scanning device 900A.

Figure 17:
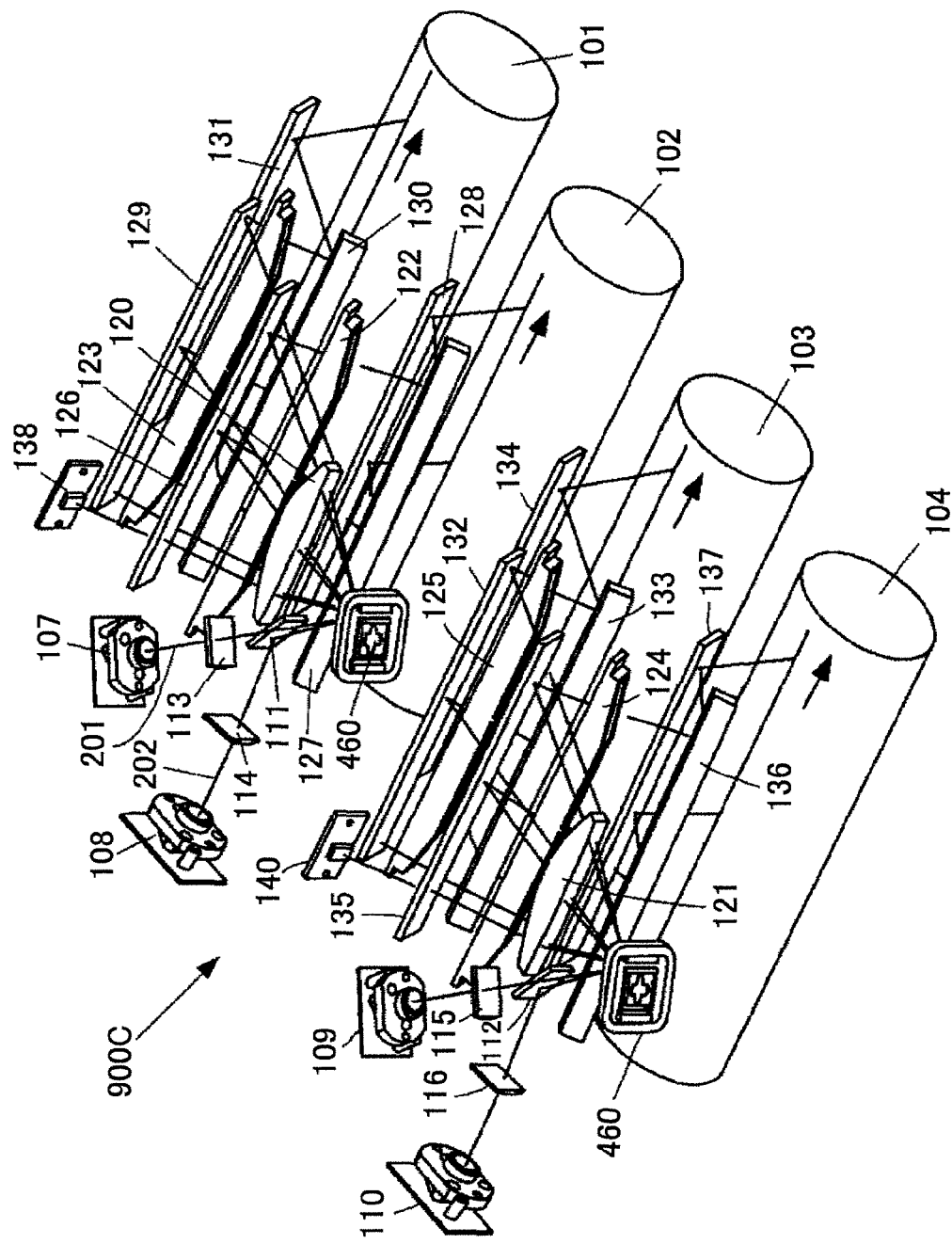
FIG. 17 is a perspective view of an optical scanning device according to a third embodiment of the present invention.
Figure 18:
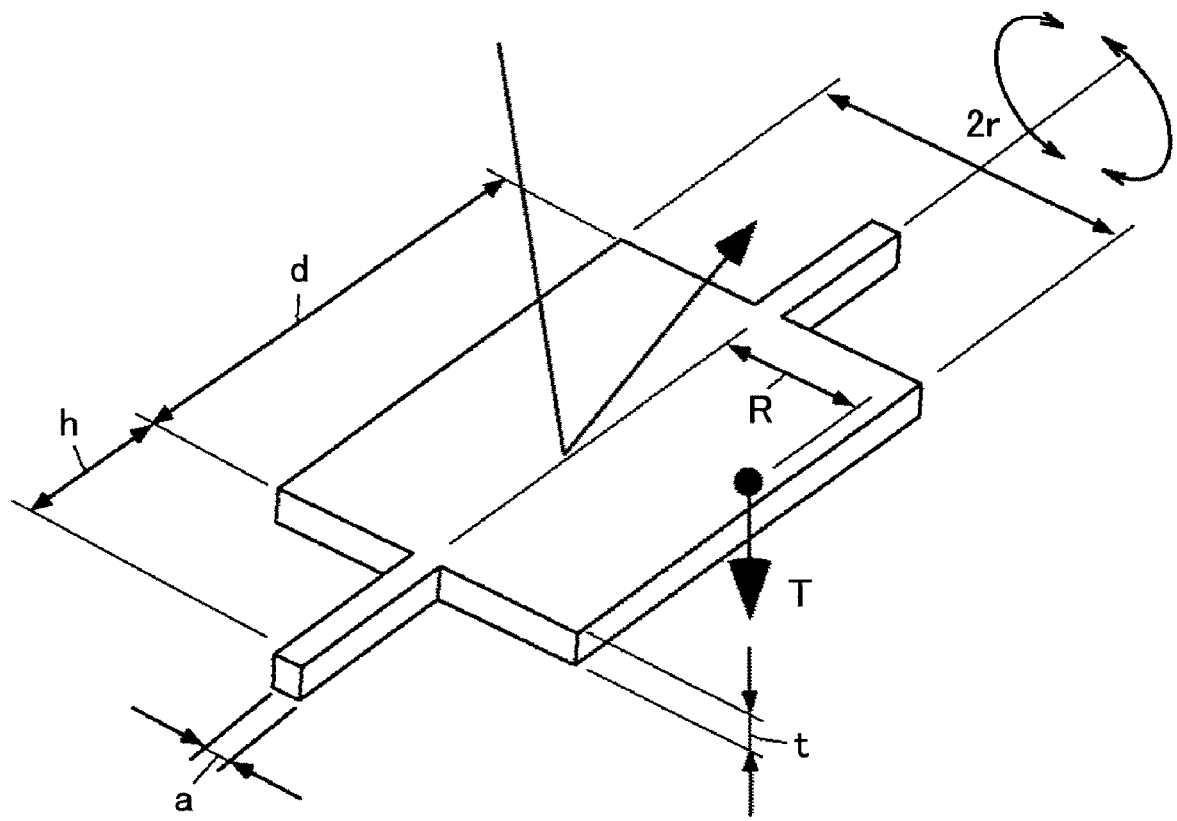
FIG. 18 is a conceptual diagram of the width of a conventional oscillating mirror in a direction orthogonal to the rotational axis thereof.

As shown in FIG. 17, an optical scanning device 900C according to a third embodiment includes two oscillating mirrors 460 arranged to deflect light beams in the same direction. The optical scanning device 900C can also be provided in an image forming apparatus, similarly to the optical scanning device 900A.

According to one embodiment of the present invention, the mass of air stirred by an oscillating mirror is limited, and the temperature inside a space in which the oscillating mirror is attached is uniform. Therefore, convections do not occur in the air, and a steady condition can be maintained. As a result, power required for rotation of the oscillating mirror is constant, so that it is not necessary to change the rotational force generated by the oscillating mirror. Accordingly, it is possible to highly precisely reduce changes in the oscillation angle (amplitude), and form high-quality images free of color displacement or color changes.

Further, according to one embodiment of the present invention, it is not necessary to attach/detach a sealing member when attaching or replacing the oscillating mirror, thereby enhancing operability. Moreover, the oscillating mirror can be handled in a sealed state and external air is prevented from flowing into the sealed space, so that dust and foreign matter are prevented from adhering to the mirror surface, thereby enhancing reliability.

Further, according to one embodiment of the present invention, the sealing member is formed integrally with a housing unit, so that the number of components can be reduced, thereby enhancing efficiency in assembly and reducing cost.

Further, according to one embodiment of the present invention, power required for rotation of the oscillating mirror is minimized, and changes in an oscillation angle (amplitude) are reduced, thus enabling forming high-quality images free of color displacement or color changes.

Further, according to one embodiment of the present invention, light beams are prevented from repeatedly being reflected by the oscillating mirrors, and reflected lights are discrete, so that light beams other than main light beams do not reach the scan object surface, thereby enabling forming high-quality images.

Further, according to one embodiment of the present invention, it is possible to equalize loss of light quantity in the main scanning direction caused by surface reflection when a light beam deflected by the oscillating mirror passes out of a window member, so that unevenness in beam strengths is reduced on a scan object surface, thereby enabling forming high-quality images.

Further, according to one embodiment of the present invention, images can be formed with low noise and low power consumption.

Further, according to one embodiment of the present invention, images can be formed in consistent write start directions, thereby forming high-quality images.

The present invention is not limited to the specifically disclosed embodiments, and variations and modifications may be made without departing from the scope of the present invention.

The present application is based on Japanese Priority Patent Application No. 2005-372903, filed on Dec. 26, 2005, the entire contents of which are hereby incorporated by reference.

What is claimed is:

1. An optical scanning device, comprising:
a light source unit configured to irradiate a light beam;
an oscillating mirror configured to deflect the light beam from the light source unit to scan a scan object surface backward and forward, the oscillating mirror being supported by a torsion beam;
a focusing optical system configured to focus the light beam deflected by the oscillating mirror on the scan object surface;
a housing unit configured to position the light source unit, the oscillating mirror, and the focusing optical system in a plane substantially orthogonal to at least the torsion beam;
an oscillating mirror driving unit configured to rotate the oscillating mirror around a rotational axis;
a window member configured to transmit the light beam incident on and reflected from the oscillating mirror; and
a sealing member configured to hold the window member and seal a space in which the oscillating mirror is mounted,
wherein a position of the window member is fixed in the plane substantially orthogonal to the torsion beam such that the angle, in the main scanning direction between a light beam from a light source unit and the normal line of the window member satisfies a predetermined relationship,
wherein the oscillating mirror and the window member are arranged at predetermined angles with respect to the light beam from the light source and an optical axis of the focusing optical system,
wherein when the oscillating mirror is in a non-rotated position, a first incident angle in a main scanning direction between the light beam from the light source unit and a normal line of the window member is greater than a second incident angle in a main scanning direction between the light beam from the light source unit and a normal line of the oscillating mirror, wherein the position of the rotational axis of the oscillating mirror is fixed in the plane orthogonal to the torsion beam such that the rotational axis of the oscillating mirror meets the intersection point of a light beam from a light source unit and a light axis of the focusing optical system.

2. The optical scanning device according to claim 1, further comprising:

a circuit board onto which the oscillating mirror is mounted, the circuit board including at least part of the oscillating mirror driving unit; wherein the sealing member and the circuit board are held integrally.

3. The optical scanning device according to claim 1, wherein:

the sealing member is part of the housing unit.

4. The optical scanning device according to claim 1, wherein:

air pressure inside the space in which the oscillating mirror is attached is adjusted not to exceed air pressure outside the space.

5. The optical scanning device according to claim 4, wherein:

the sealing member includes an air pressure adjusting unit configured to adjust the air pressure inside the space in which the oscillating mirror is mounted.

6. The optical scanning device according to claim 1, wherein:

the window member is slanted at a predetermined angle in a sub scanning direction with respect to a mirror surface of the oscillating mirror.

7. An image forming apparatus for forming an image, the image forming apparatus including the optical scanning device according to claim 1, wherein the oscillating mirror is driven at a predetermined scanning frequency, an electrostatic latent image is formed on an image carrier by modulating the light source unit according to image information during forward scanning or backward scanning, the electrostatic latent image is turned into a visible image, and the visible image is transferred onto a recording medium.

8. An image forming apparatus for forming a multicolor image, the image forming apparatus including the optical scanning device according to claim 1, wherein plural of the oscillating mirrors are provided, which mirrors are driven by a common scanning frequency, electrostatic latent images of different colors are formed on image carriers corresponding to the different colors by modulating the light source unit according to image information during forward scanning or backward scanning, the electrostatic latent images are turned into visible images, the visible images are superposed onto a transfer body, and the superposed visible images are transferred onto a recording medium.

9. The image forming apparatus according to claim 8, wherein the plural oscillating mirrors are all attached in the said space.

10. The image forming apparatus according to claim 8, wherein the electrostatic latent images of the different colors are aligned with each other in a scanning direction of the plural oscillating mirrors.

11. The optical scanning device according to claim 1, wherein an angle between the light beam from the light source unit and an optical axis of the focusing optical system is twice the angle between the light beam from the light source unit and the normal line of the oscillating mirror.

12. The optical scanning device according to claim 1, further comprising a valve connected in fluid communication with an interior of the housing unit and configured to maintain an open state while a gas pressure inside the housing is greater than a pressure outside the housing and configured to maintain a closed state while a gas pressure inside the housing is less than a pressure outside the housing.

* * * * *